(12) United States Patent
Fuse

(10) Patent No.: US 9,558,149 B2
(45) Date of Patent: Jan. 31, 2017

(54) DUAL SYSTEM

(71) Applicant: NEC Corporation, Minato-ku, Tokyo (JP)

(72) Inventor: Sayuri Fuse, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/202,681

(22) Filed: Mar. 10, 2014

(65) Prior Publication Data

US 2014/0281314 A1 Sep. 18, 2014

(30) Foreign Application Priority Data

Mar. 14, 2013 (JP) ................................ 2013-051758

(51) Int. Cl.
| | | |
|---|---|---|
| G06F 3/00 | (2006.01) | |
| G06F 13/00 | (2006.01) | |
| G06F 13/12 | (2006.01) | |
| G06F 13/38 | (2006.01) | |
| G06F 15/173 | (2006.01) | |
| G06F 1/30 | (2006.01) | |
| G06F 1/00 | (2006.01) | |

(52) U.S. Cl.
CPC .......... *G06F 15/17331* (2013.01); *G06F 1/00* (2013.01); *G06F 1/30* (2013.01); *G06F 3/00* (2013.01)

(58) Field of Classification Search
CPC ...... G06F 9/3001; G06F 11/104; G06F 15/16; G06F 17/15; G06F 21/00
USPC ...................................... 710/1, 7, 20, 25, 72
See application file for complete search history.

(56) References Cited

U.S. PATENT DOCUMENTS

| | | | | |
|---|---|---|---|---|
| 6,438,660 B1* | 8/2002 | Reams | ................ | G06F 12/0804 710/39 |
| 6,725,370 B1* | 4/2004 | Sakakura | ............ | H04L 63/0428 713/155 |
| 6,802,023 B2 | 10/2004 | Oldfield et al. | | |
| 8,464,347 B2* | 6/2013 | Maeda | .................... | G06F 21/51 380/255 |

(Continued)

FOREIGN PATENT DOCUMENTS

| | | |
|---|---|---|
| JP | 2000-047894 A | 2/2000 |
| JP | 2002-333935 A | 11/2002 |

(Continued)

OTHER PUBLICATIONS

Japanese Office Action for JP Application No. 2013-051758 mailed on Nov. 8, 2016.

*Primary Examiner* — Idriss N Alrobaye
*Assistant Examiner* — Getente A Yimer

(57) ABSTRACT

A dual system according to the present invention includes: a memory copying unit configured to, when an arithmetic device of a first computer module is installed into the dual system, execute a memory copy process of copying data in a memory region of a second computer module into a memory region of the first computer module; a substitute processing unit configured to execute a service substitute process that is executed by a different arithmetic device from an arithmetic device executing the memory copy process and that is part of processes involved in the information processing service by the dual system; and a shared memory that stores data of the service substitute process by the substitute processing unit. The shared memory is excluded from the target of the memory copy process.

7 Claims, 21 Drawing Sheets

(56) References Cited

U.S. PATENT DOCUMENTS

| | | | | |
|---|---|---|---|---|
| 8,635,382 B2* | 1/2014 | Chancel | ............... | G06F 1/3203 |
| | | | | 710/15 |
| 2002/0133743 A1 | 9/2002 | Oldfield et al. | | |
| 2003/0126348 A1* | 7/2003 | Jung | ................... | G06F 13/1657 |
| | | | | 710/314 |
| 2014/0289469 A1* | 9/2014 | Ishii | ................... | G06F 12/1045 |
| | | | | 711/119 |

FOREIGN PATENT DOCUMENTS

| JP | 2009-245015 A | 10/2009 |
|---|---|---|
| JP | 2012-108685 A | 6/2012 |

\* cited by examiner

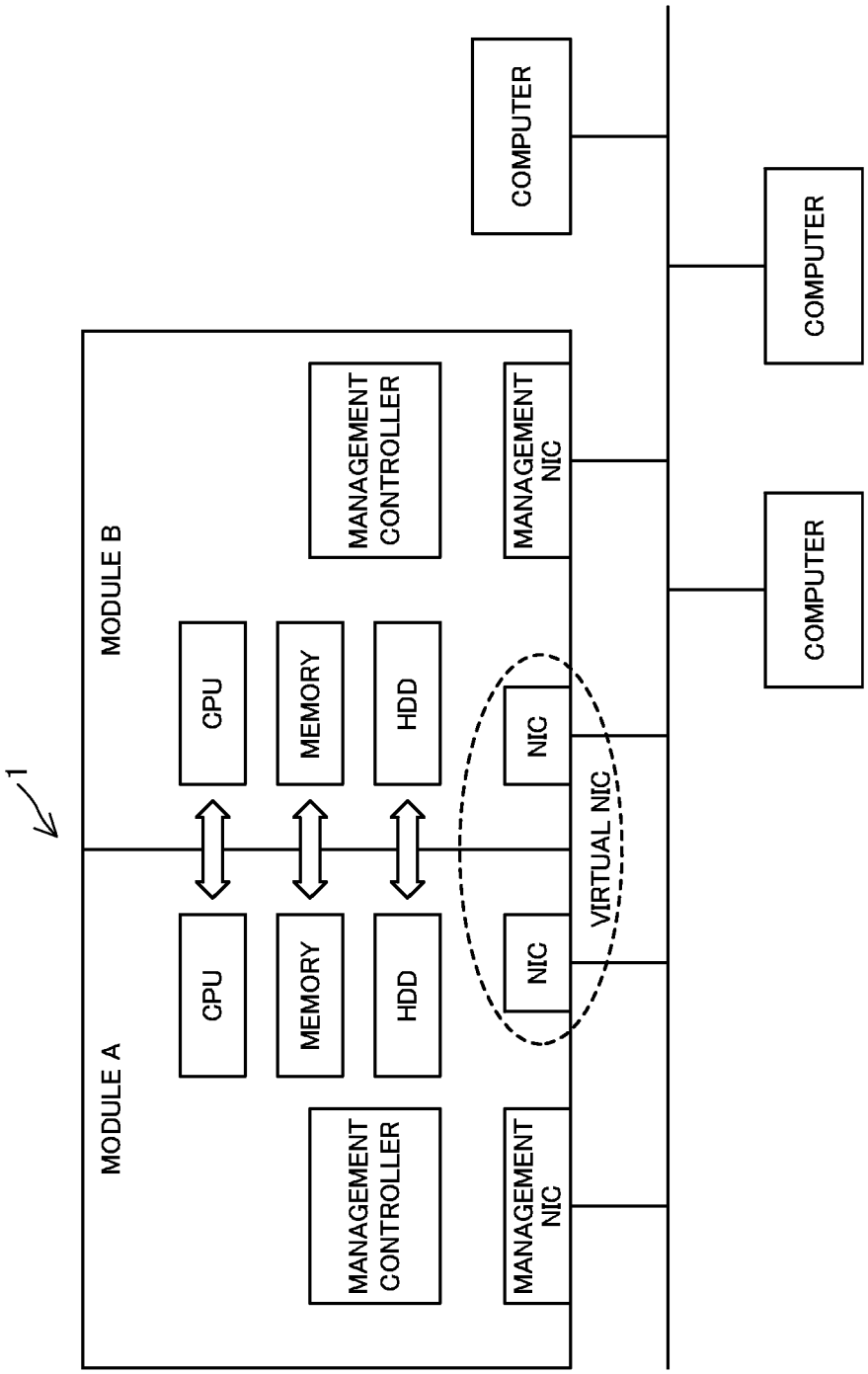

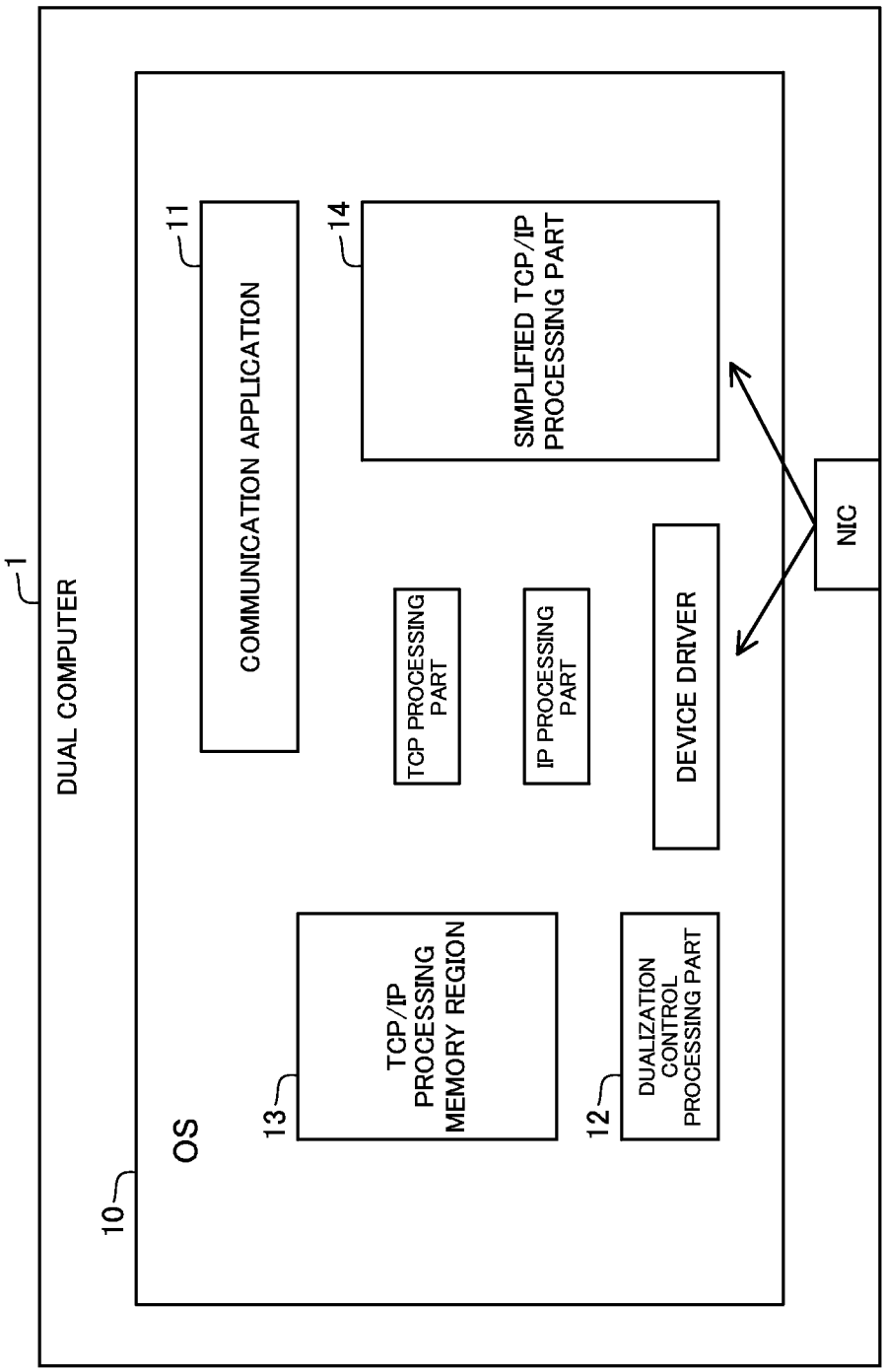

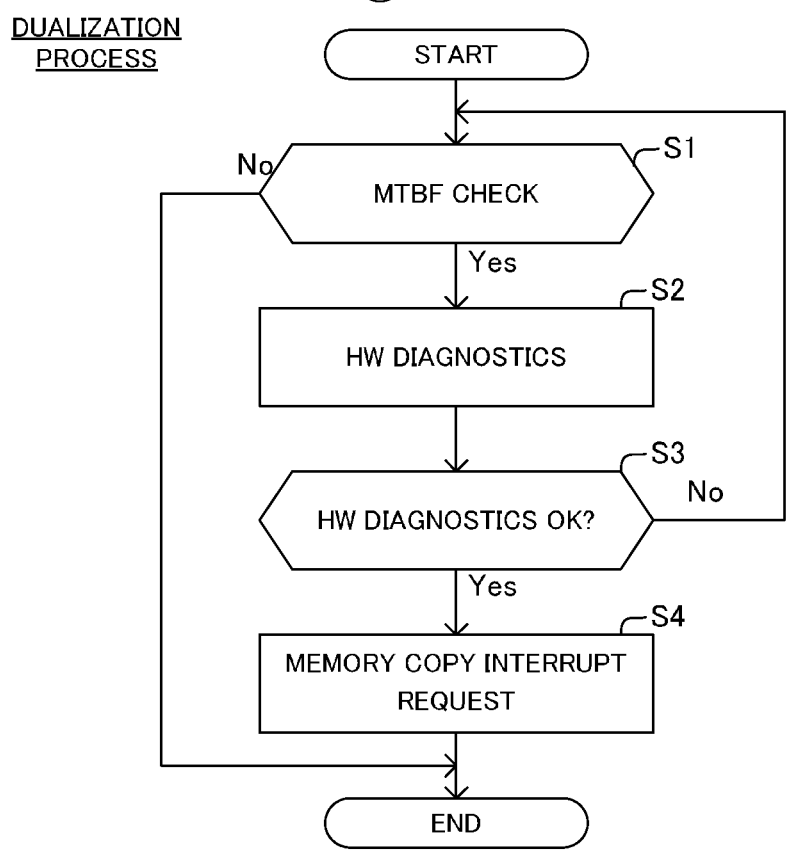

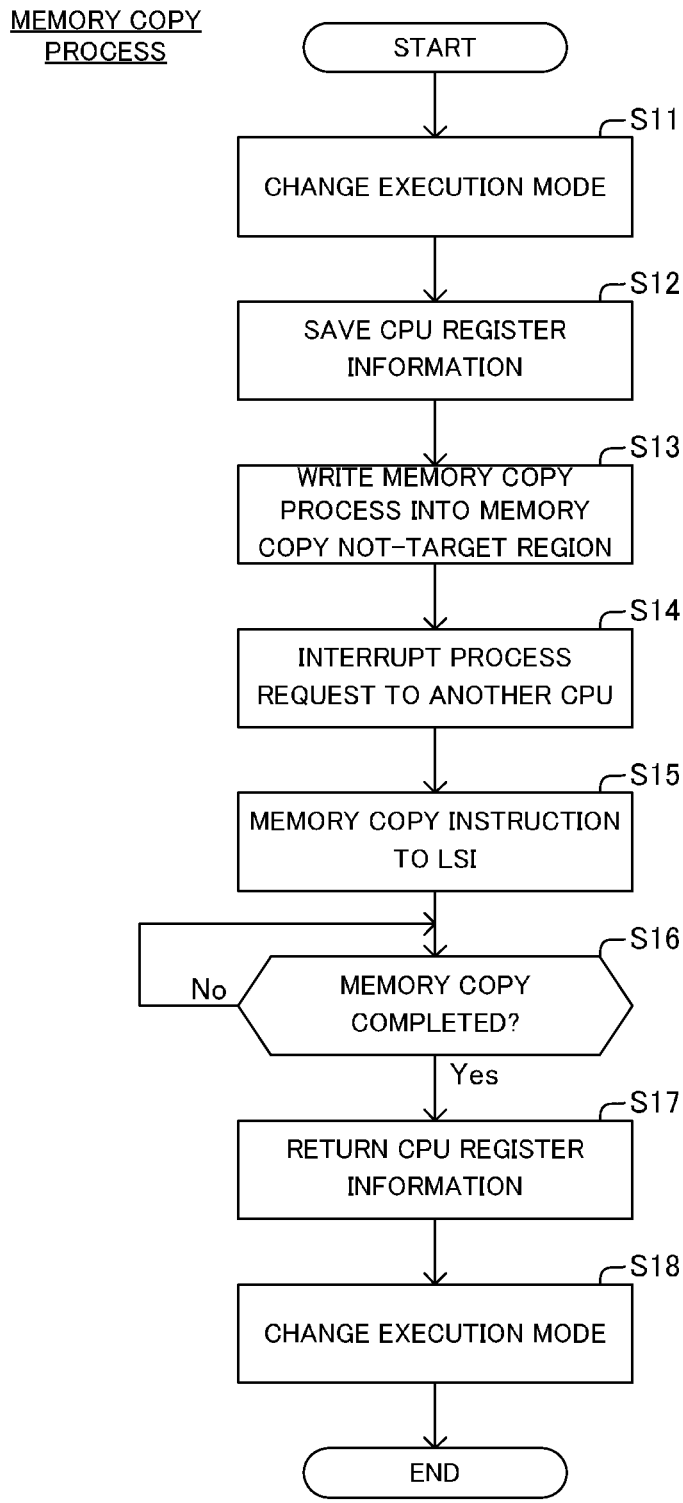

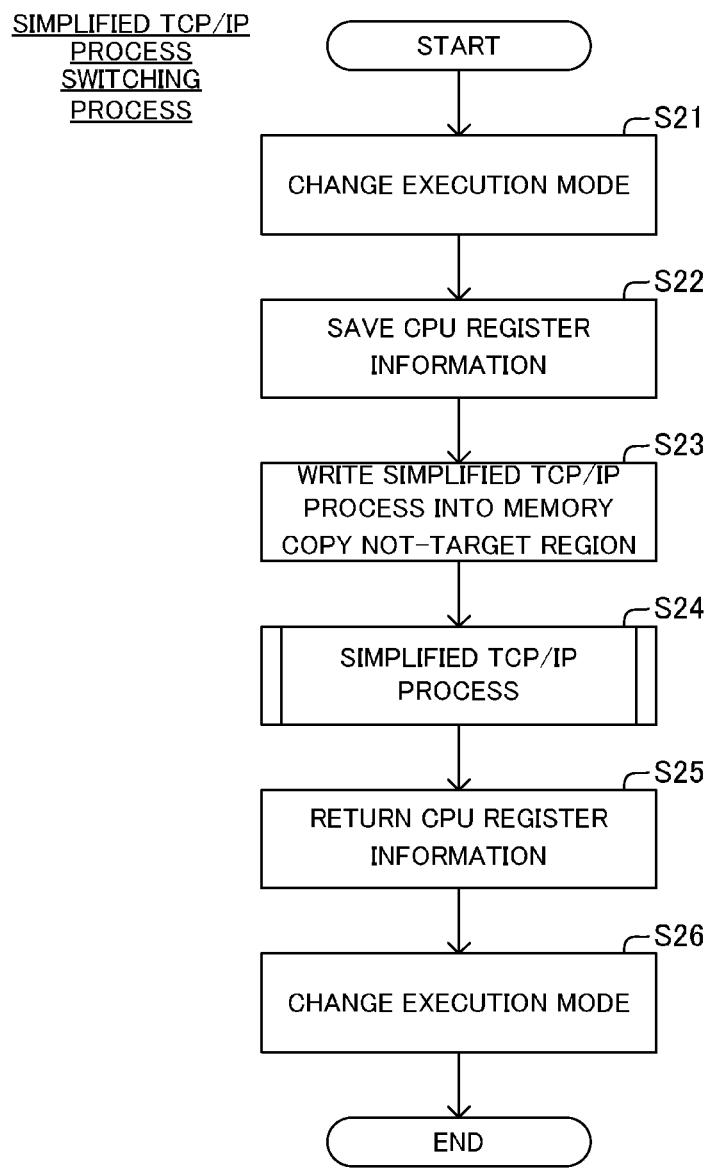

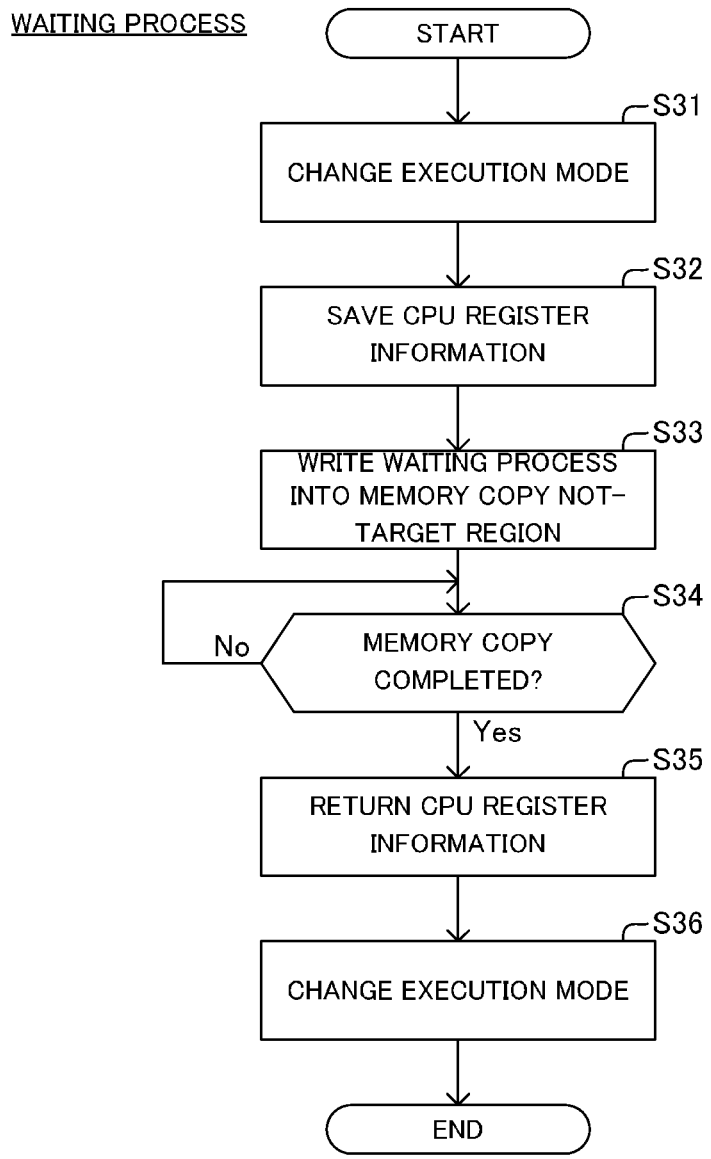

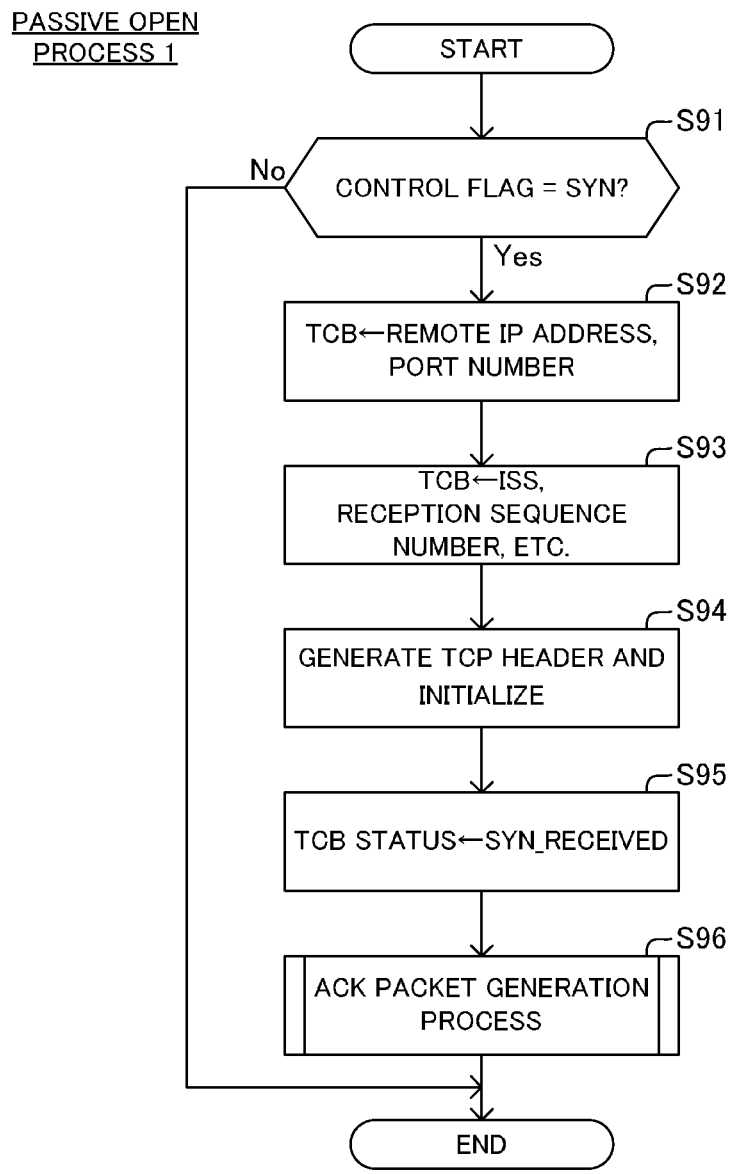

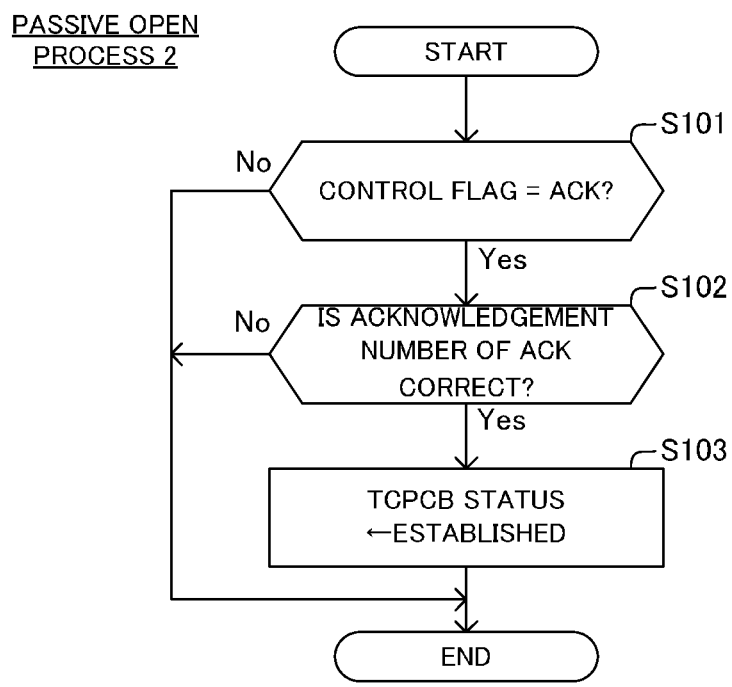

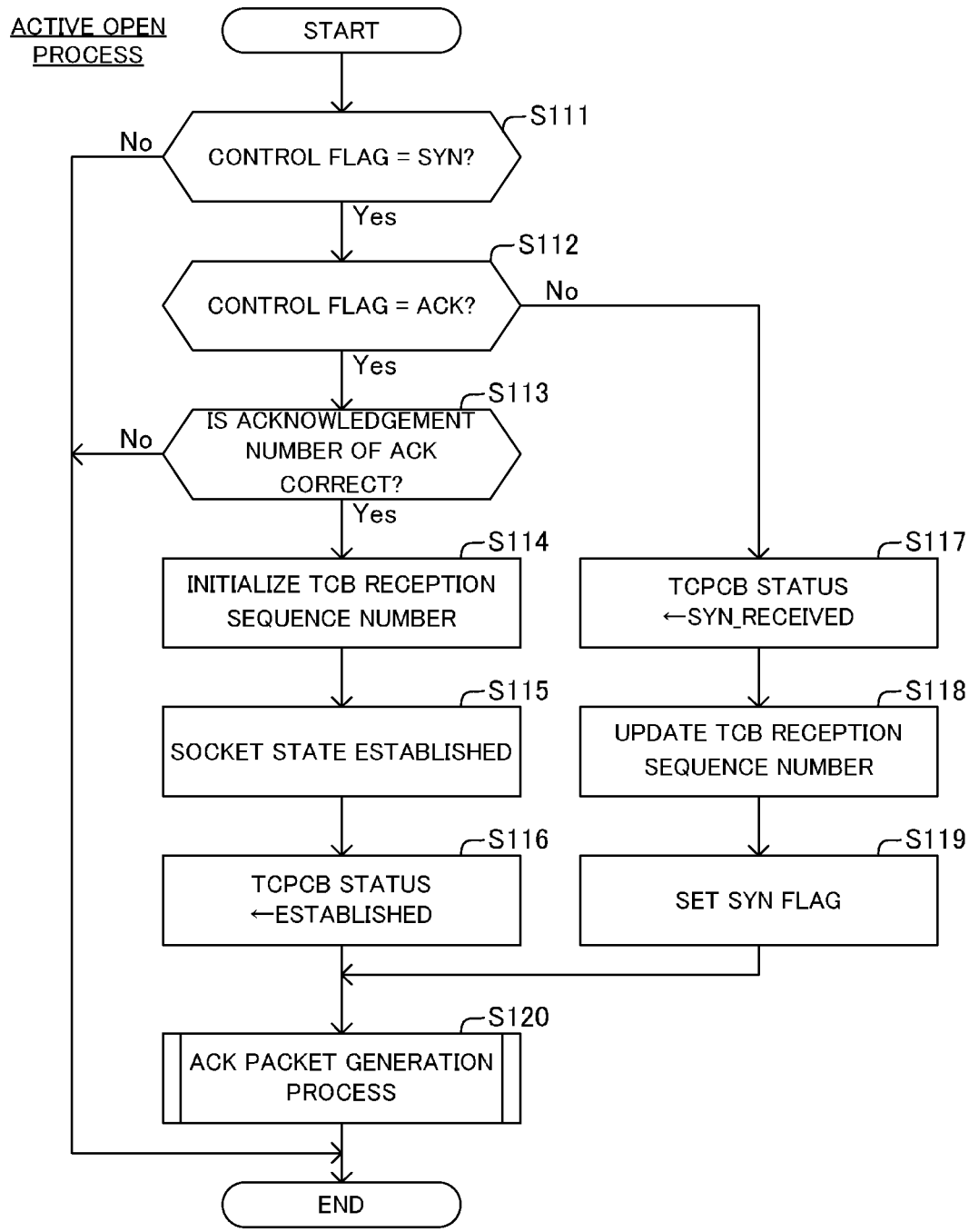

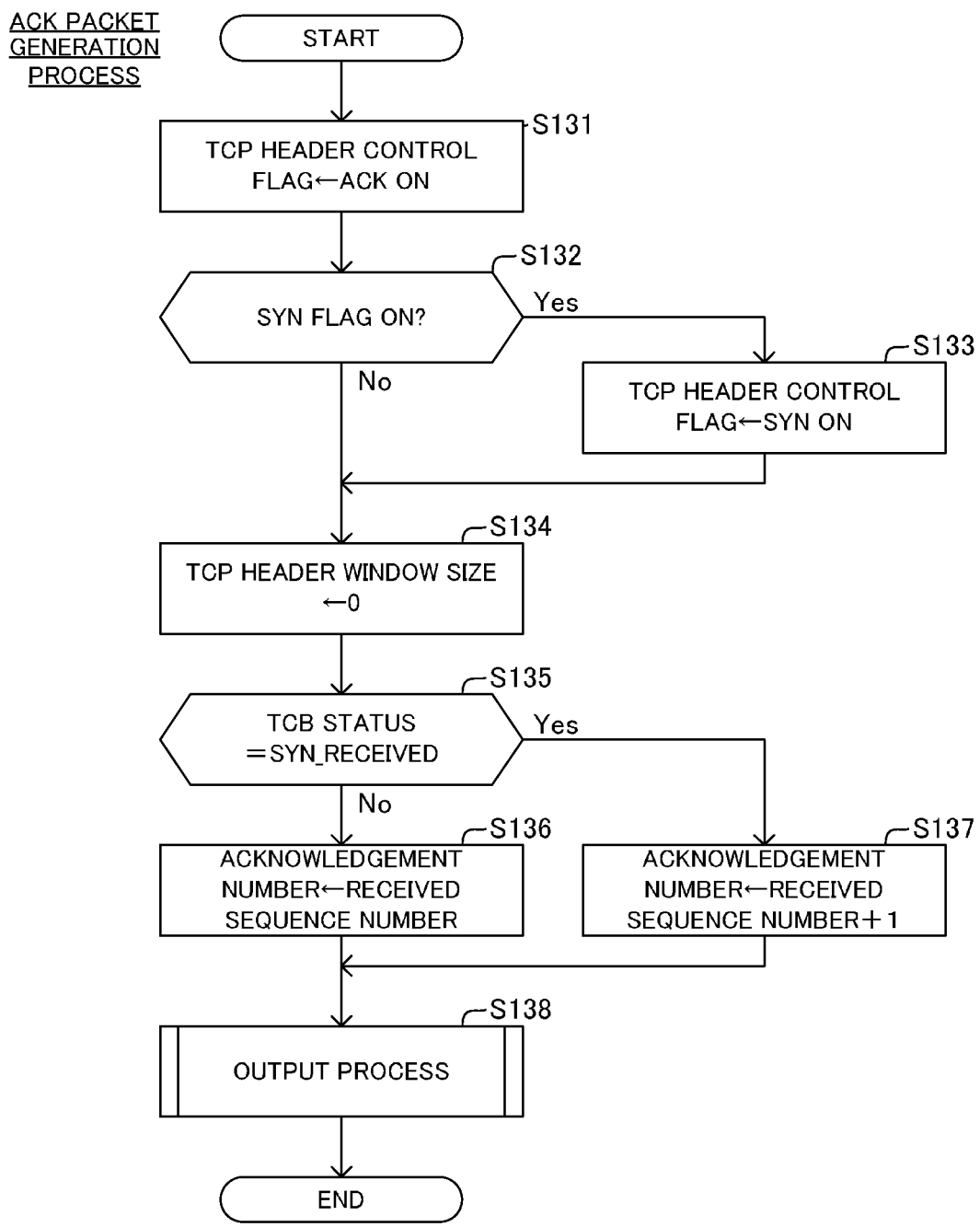

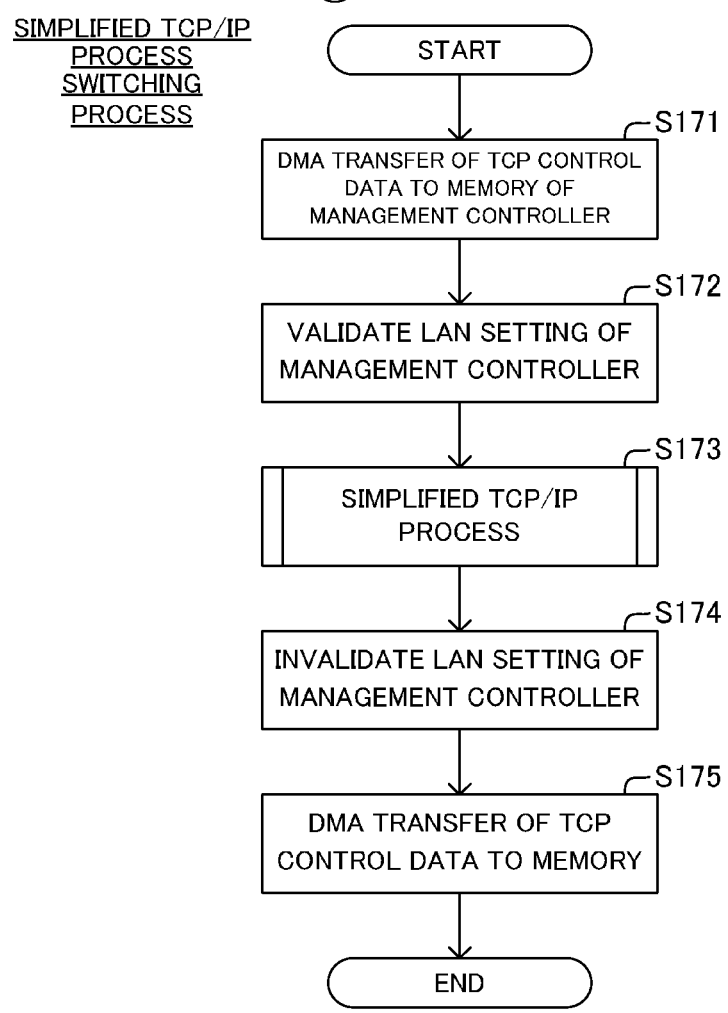

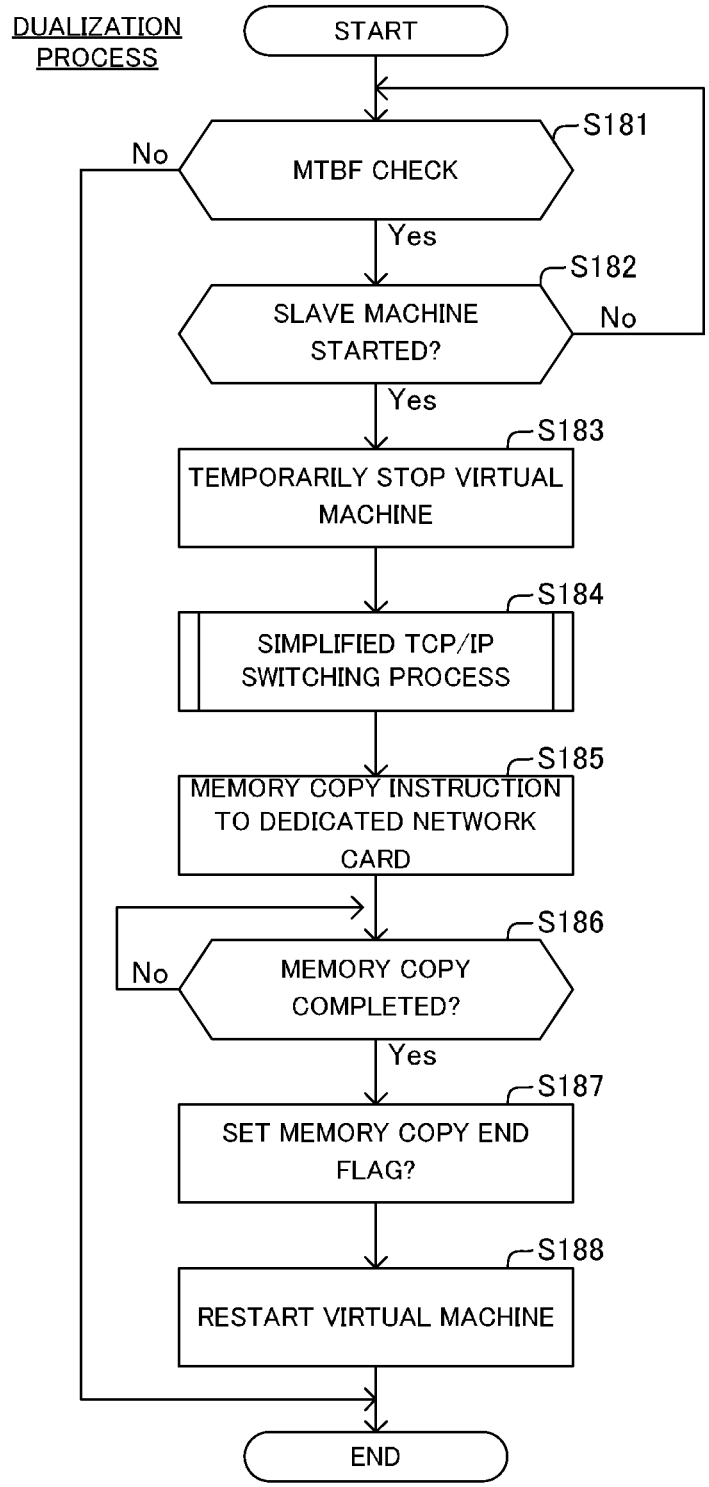

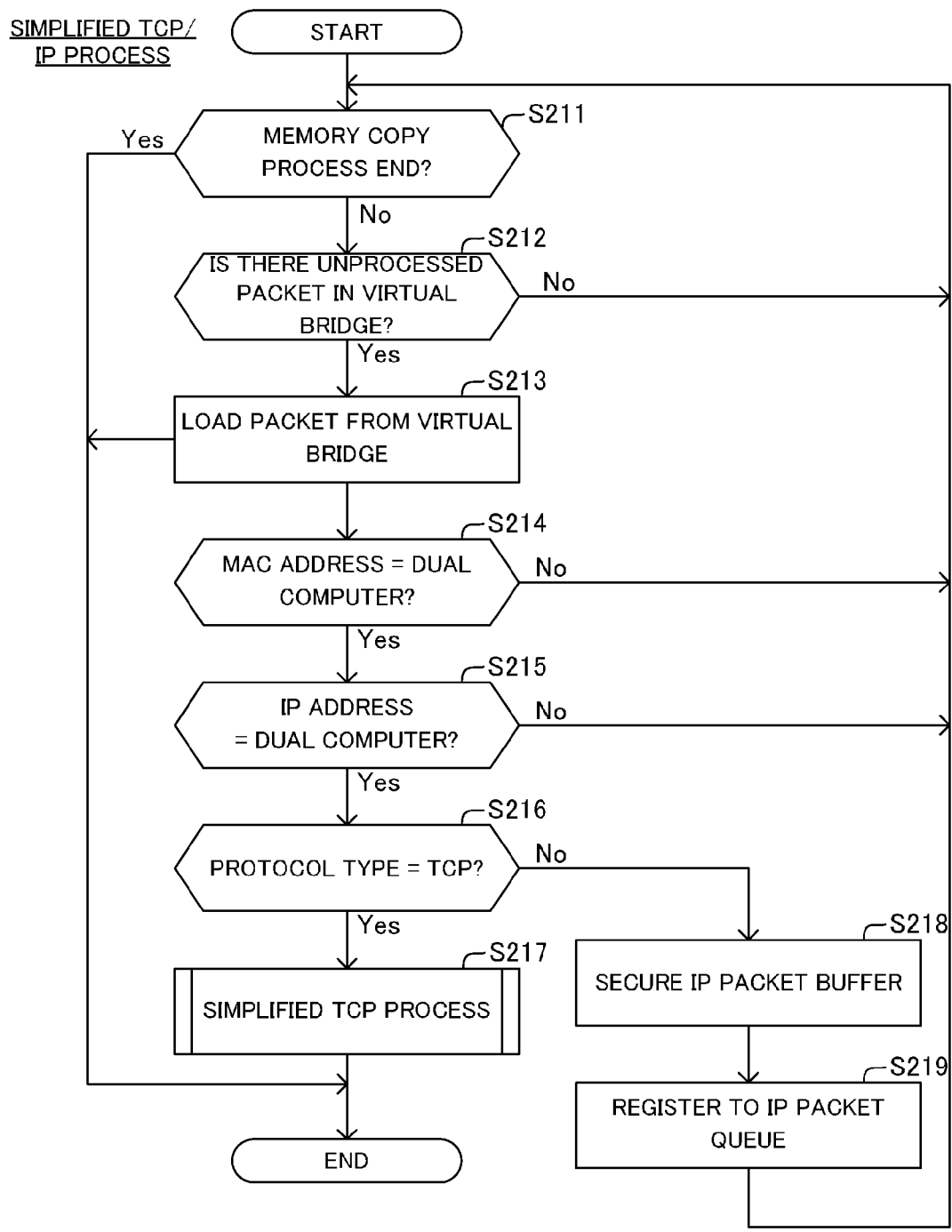

DUAL SYSTEM

INCORPORATION BY REFERENCE

This application is based upon and claims the benefit of priority from Japanese patent application No. 2013-051758, filed on Mar. 14, 2013, the disclosure of which is incorporated herein in its entirety by reference.

TECHNICAL FIELD

The present invention relates to a dual system, more specifically, relates to a dual system that executes a memory copy process.

BACKGROUND ART

For a system which is required to be highly reliable and available and is not allowed to cause communication timeout while constantly communicating with clients, a dual computer as shown in Patent Document 1 is used. For example, a dual system is applied to an application server, a virtual PC (Personal Computer) server of a thin client system, a production management server used in a manufacturing factory, an online payment system, and so on.

A computer that configures such a dual system has major hardware components in twos within the system, such as a CPU (Central Processing Unit), a memory and a PCI (Peripheral Component Interconnect) adapter, and the components are caused to synchronize by a dedicated LSI (Large Scale Integration) and a driver. Thus, an OS (Operating System) of the dual system operates regardless of a dual state of the hardware.

When one of the hardware components causes an error, the dual system isolates the hardware component from the system and temporarily continues to operate with only the other hardware component (this state is referred to as a fallback state). After that, the isolated hardware component is initialized and installed into the system again. If the installation is completed without any problem, the system returns to the dual state.

[Patent Document 1] Japanese Unexamined Patent Application Publication No. JP-A 2009-245015

Although the application and the OS operate without any specific problem when the system is in the dual state as described above, the system may be affected when the hardware component is installed into the system. To be specific, when the CPU is installed, memory copy from the main system to the sub system is performed so that the memories of both the main system and the sub system are caused to synchronize. A memory region that is constantly used by the system and always changed may be copied while the operation of the system is temporarily stopped. As a result, there is a case where communication with other computers is interrupted during the copy process and communication timeout occurs on a connected client computer that the system provides with an information processing service, and there is a possibility that execution of the application program is in trouble. A general system can avoid timeout by regulating TCP timeout values on both the server computer and the client computer, but the dual system is applied to a system required to be reliable and available because of the characteristics of the dual system. Therefore, it is desirable that only the server deals with the trouble.

SUMMARY

Accordingly, an object of the present invention is to provide a dual system capable of solving the abovementioned problem that the operation of the system is temporarily stopped.

A dual system as an exemplary embodiment of the present invention is a dual system configured to provide a predetermined information processing service and equipped with dual computer modules composed of a first computer module and a second computer module, the dual system including:

a memory copying unit configured to, when an arithmetic device of the first computer module is installed into the dual system, execute a memory copy process of copying data in a memory region of the second computer module into a memory region of the first computer module;

a substitute processing unit configured to execute a service substitute process that is executed by a different arithmetic device from an arithmetic device executing the memory copy process and that is at least part of processes involved in the information processing service by the dual system; and a shared memory that can be accessed by the second computer module and the substitute processing unit and that stores data of the information processing service by the second computer module and data of the service substitute process by the substitute processing unit, wherein the memory copying unit is configured to execute the memory copy process while excluding the shared memory from a target of the memory copy process.

A medium as another exemplary embodiment of the present invention is a non-transitory computer-readable medium storing a program including instructions for causing a dual system, which is configured to provide a predetermined information processing service and equipped with dual computer modules composed of a first computer module and a second computer module, to realize:

a memory copying unit configured to, when an arithmetic device of the first computer module is installed into the dual system, execute a memory copy process of copying data in a memory region of the second computer module into a memory region of the first computer module;

a substitute processing unit configured to execute a service substitute process that is executed by a different arithmetic device from an arithmetic device executing the memory copy process and that is at least part of processes involved in the information processing service by the dual system; and a shared memory that can be accessed by the second computer module and the substitute processing unit and that stores data of the information processing service by the second computer module and data of the service substitute process by the substitute processing unit, and the program including instructions for causing the dual system to realize that the memory copying unit is configured to execute the memory copy process while excluding the shared memory from a target of the memory copy process.

A dualizing method as another exemplary embodiment of the present invention is a dualizing method by a dual system configured to provide a predetermined information processing service and equipped with dual computer modules composed of a first computer module and a second computer module, the dualizing method including:

executing a memory copy process of copying data in a memory region of the second computer module into a memory region of the first computer module, when an arithmetic device of the first computer module is installed into the dual system; and executing a service substitute process that is executed by a different arithmetic device from an arithmetic device executing the memory copy process and that is at least part of processes involved in the information processing service by the dual system, wherein the memory copy process is executed while excluding a shared memory from a target of the memory copy process, the shared memory being able to be accessed by the second computer module and an arithmetic device configured to execute the service substitute process, and the shared memory storing data of the information processing service by the second computer module and data of the service substitute process.

Configured as described above, the present invention can prevent a highly reliable dual system that can prevent the operation of the system from being temporarily stopped.

BRIEF DESCRIPTION OF DRAWINGS

FIG. 1 is a block diagram showing a configuration of hardware of a dual system in a first exemplary embodiment of the present invention;

FIG. 2 is a function block diagram showing a configuration of the dual system disclosed in FIG. 1;

FIG. 3A is a flowchart showing an operation of the dual system disclosed in FIG. 2;

FIG. 3B is a flowchart showing an operation of the dual system disclosed in FIG. 2;

FIG. 4A is a flowchart showing an operation of the dual system disclosed in FIG. 2;

FIG. 4B is a flowchart showing an operation of the dual system disclosed in FIG. 2;

FIG. 7A is a flowchart showing an operation of the dual system disclosed in FIG. 2;

FIG. 7B is a flowchart showing an operation of the dual system disclosed in FIG. 2;

FIG. 7C is a flowchart showing an operation of the dual system disclosed in FIG. 2;

FIG. 8A is a flowchart showing an operation of the dual system disclosed in FIG. 2;

FIG. 10B is a flowchart showing an operation of the dual system disclosed in FIG. 9;

FIG. 12A is a flowchart showing an operation of the dual system disclosed in FIG. 11;

FIG. 13B is a flowchart showing an operation of the dual system disclosed in FIG. 11;

EXEMPLARY EMBODIMENT

First Exemplary Embodiment

Figure 5A:
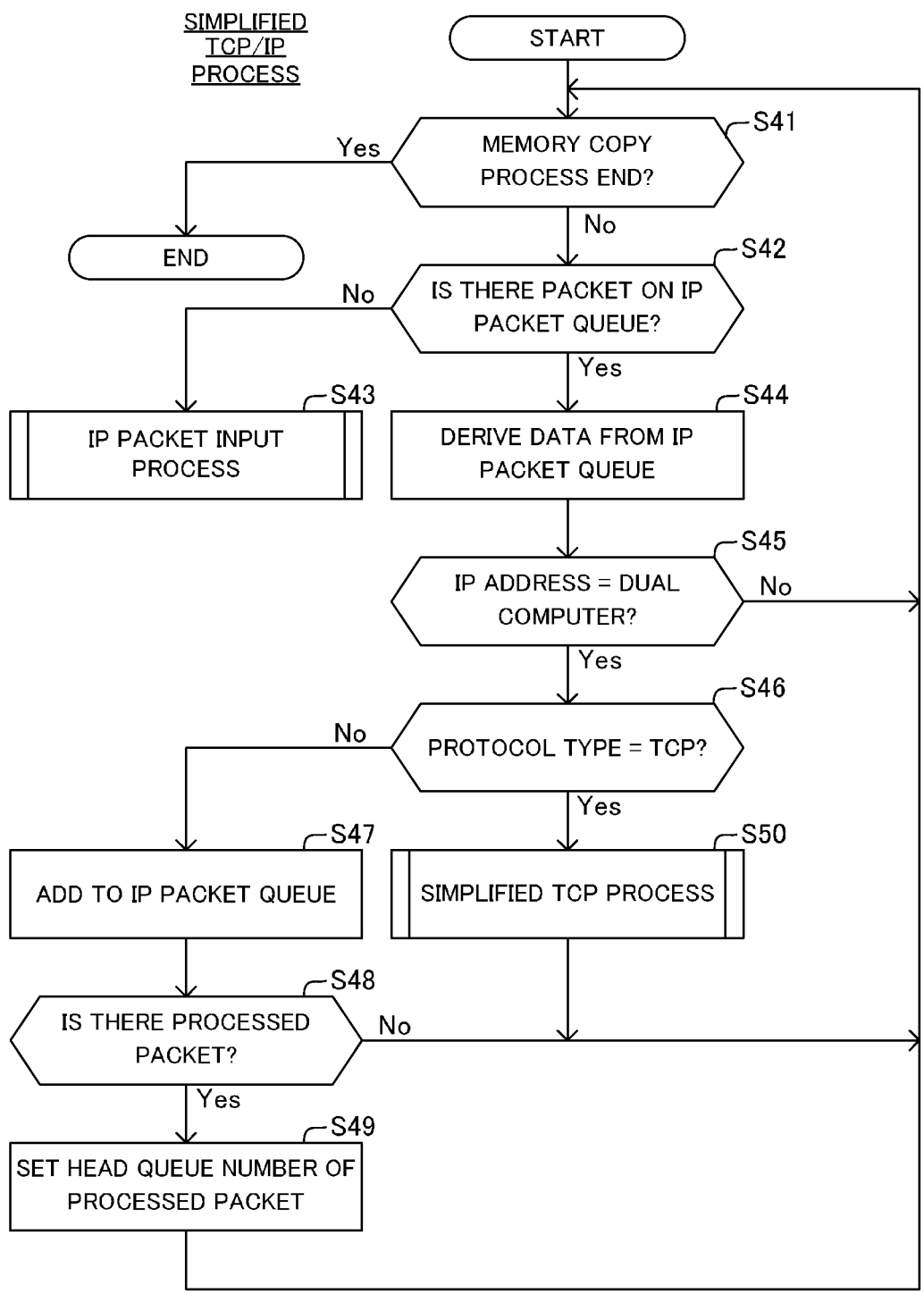
FIG. 5A is a flowchart showing an operation of the dual system disclosed in FIG. 2.

Referring to FIGS. 1 to 8B, a first exemplary embodiment of the present invention will be described. FIGS. 1 and 2 are diagrams showing configurations of a dual system, and FIGS. 3A to 8B are diagrams showing operations of the dual computer.

As shown in FIG. 1, a dual computer 1 (a dual system) in this exemplary embodiment has major hardware components configuring the computer in twos, such as a CPU (Central Processing Unit), a memory, a HDD (Hard Disk Drive) and a PCI (Peripheral Component Interconnect) adapter. That is, the dual computer 1 includes computer modules (A, B: first computer module, second computer module) in twos, each having the hardware components.

The dual computer 1 in this exemplary embodiment is configured to temporarily execute simplified TCP/IP process during memory copy executed when returning from the hardware fallback state to the dual state, instead of the OS (Operating System). To be specific, the dual system 1 has a memory region (a shared memory) that stores control data and execution image relating to communication processing by the OS and that is not the target of memory copy, and loads a substitute process into the memory region when starting memory copy. Below, a specific configuration of the dual computer will be described.

FIG. 2 is a configuration diagram illustrating a function block structured by installation of a program into the CPUs included by the dual computer 1. As shown in this diagram, the dual computer 1 includes an OS 10 that controls itself, and a communication application 11 that executes at least part of processing of an information processing service provided by the dual computer 1.

Further, the dual computer 1 includes a dualization control processing part 12. When one of the hardware components such as the CPUs causes an error, the dualization control processing part 12 first isolates the hardware from the system and controls to temporarily continue to operate with only the other one of the hardware components. The dualization control processing part 12 then executes a dualization process that is controlling so that the isolated hardware is initialized and installed into the system again and the system returns to the dual state. Below, a case where the CPU of the computer module A causes an error and this CPU is installed into the system again will be described as an example.

Further, the dualization control processing part 12 includes a function (a memory copying means, not shown in the drawings) that executes a memory copy process called in the dualization process that the CPU is installed into the system as described above. In this memory copy process, when the isolated CPU of the computer module A is installed, a process of copying data in a memory region of the computer module B into a memory region of the computer module A with the CPU installed is executed. This memory copy process is executed by the CPU of the computer module B.

Further, the dual computer 1 includes a function that executes a simplified TCP/IP switching process called by an interrupt during the memory copy process and a waiting process called by an interrupt during the memory copy process simultaneously. Moreover, the dual computer 1 includes a simplified TCP/IP processing part 14 (a substitute processing means) that executes a simplified TCP/IP process as a substitute of a TCP/IP process executed by the OS 10 during the memory copy process. Furthermore, the dual computer 1 includes a function that executes an IP packet input process of loading a packet from a network device and a simplified TCP process of executing a TCP process. A device driver, an IP processing part and a TCP processing part are functions included by the OS 10.

Further, the dual computer 1 in this exemplary embodiment includes a shared memory that can be referred to during the memory copy process, the simplified TCP/IP switching process, the waiting process and the simplified TCP/IP process and that is not the memory copy target in the memory copy process. That is, data stored in the shared memory is excluded from the target copied from the module B into the module A in the memory copy process executed when the CPU of the module A is installed.

The shared memory is, for example, a TCP/IP processing memory region 13 shown in FIG. 2. The shared memory further includes a "delayed copy target region" and a "not-target region." The "delayed copy target region (a delayed copy region)" is generally used in the TCP/IP process by the OS 10, and stores TCP/IP control data. For example, when the CPU of the module A is isolated, TCP/IP control data that can be accessed by the CPU of the module B and that is information of communication processing as part of an information processing service to be executed is stored into the "delayed copy target region" of the shared memory. The "delayed copy target region" can also be referred to by the simplified TCP/IP processing part 14, and stores TCP/IP control data processed by the simplified TCP/IP processing part 14 and an IP packet buffer. After memory copy in the memory copy process is completed, the "delayed copy target region" is copied from the module B into the module A after a delay. A delayed copy process on the "delayed copy target region" is executed by a delayed copy processing function (a delayed copying means) provided in the dualization control processing part 12.

Further, the "not-target region" of the shared memory stores data needed only during copy, such as an executable code of a program running in the memory copy process and CPU register information. Therefore, no data in the "not-target region" is copied not only in the memory copy process but also in any other cases.

The memory copy process with the abovementioned configuration will be specifically described. In general, during the memory copy process, one of the CPUs of the dual computer 1 is occupied by processes of memory copy, and the other CPU is in a sleep state. For example, when the module A is installed as described above, one of CPUs mounted in the module B executes the memory copy process and the other CPU mounted in the module B is in the sleep state. Therefore, according to the present invention, during the memory copy process, the other CPU that is not executing the memory copy process is caused to temporarily execute a substitute process of the TCP/IP process by the OS 10. In this example, it is assumed that the module B includes a plurality of CPUs.

To be specific, during the memory copy process, the application 11 and the OS 10 stop operating because the memory should not be updated. Thus, a process executed by the other CPU is not the same as the TCP/IP process by the OS 10, and hence, it is considerably difficult to take over update data of the TCP/IP control block and a transmission/reception data buffer during the substitute process. Therefore, control data used in the TCP/IP process by the OS 10 is stored into a memory region that can also be referred to in the substitute process. This memory region is the abovementioned "delayed copy target region" of the shared memory and is not the target of memory copy executed while the system is stopped as mentioned above, and can be updated while the system is stopped.

Further, during the memory copy process, the substitute processing means cannot notify arrival of reception data accompanying an information processing service provided by the dual computer to a user program, instead of the OS 10. Therefore, processes that the substitute processing means can deal with are limited. That is, the substitute processing means does not perform reception of user data or notification to a user program for communication data arriving at the dual computer 1, and only executes a process of maintaining a session for the arriving communication data.

The outline of the TCP/IP substitute process (the simplified TCP/IP process) executed during the memory copy process described above is as follows. First, a communication packet is acquired from a network driver through an IP packet queue in the TCP/IP communication process by the OS 10, and is also acquired in the same manner in the TCP/IP substitute process. In the TCP/IP substitute process, after all of the IP packets on the queue are processed, an Ethernet packet is acquired directly from a network device (NIC: Network Interface Card) instead of the network driver.

With regard to the processing of a communication packet, in general, in the TCP process by the OS 10, reset of a timeout timer, notification to the application, regulation of a window size and so on are executed in accordance with a TCP control flag when the packet arrives. On the other hand, in the TCP/IP substitute process, no data is accepted and no process that needs notification to the application is executed. That is, among reception data that have arrived at the dual computer 1, one which is in a connection established state or an establishment waiting state and which needs an ACK response is dealt with. Data in a close-wait state is not dealt with.

Further, in the TCP/IP substitute process, a RESET request and a FIN request are not processed because both the requests are disconnection requests. Moreover, reception data is not dealt with when a PSH flag or an URG flag is set because instant notification to the application is required. Accordingly, in the TCP/IP substitute process, an ACK response in the ESTABLISHED state and a connection establishment process in a LISTEN state, a SYS_RCVD state and a SYS_SENT state are executed. A received segment not to be processed is added to the IP queue so that it can be processed in the original TCP processing after memory copy ends.

In a case where an ACK response is required, the dual computer receives data but cannot accept the data. Therefore, in the TCP/IP substitute process, an ACK segment in which the sequence number of the received segment is set to an acknowledgement number and the window size is set to 0 is sent. However, in the case of an ACK response to a SYN request at the time of connection establishment, if the sequence number of the received segment is sent, an error is detected in segment check at the destination. Therefore, a value of the sequence number+1 is sent as an acknowledgement number. Thus, the connection is maintained though the sender stops sending for a while. Window size check by the client is waited before communication is restarted.

As described above, according to the present invention, when the hardware is installed in the dual computer 1, communication processing as part of an information processing service temporarily stopped is executed as simplified processing of only maintaining a session. Consequently, it is possible to maintain a communication state with a client computer accompanying the information processing service and avoid network timeout.

Next, referring to flowcharts shown in FIGS. 3A to 8B, specific operations of the dual computer 1 according to the present invention will be described.

First, in a dualization process shown in FIG. 3A, MTBF check is performed when the dual computer 1 returns the CPU fallback state to the dual state (step S1). In a case where a value obtained in the check is within a threshold, hardware diagnostics of the CPU to be installed is caused to operate (step S2). When there is no problem (step 3: Yes), the operating CPU is made to cause an interrupt, and a memory copy process registered on an interruption table is called (step S4).

In a memory copy process shown in FIG. 3B as an interrupt handler, an execution mode is caused to shift to a privilege mode (step S11), and next, register information of the CPU is saved into the memory region that is not the target of memory copy (step S12). Moreover, an executable code of the memory copy process is also copied into the memory region (step S12), and an interrupt instruction is issued to the other CPU (step S14).

After that, in the memory process, a memory copy instruction is issued to an LSI and completion check is regularly performed (step S15). Actual memory copy is executed by the LSI by directly accessing the memory not via the CPU. During this memory copy, the CPU operates in a high priority mode and cannot execute another interrupt process during this process. In the memory copy process, it is asked to the LSI whether memory copy is completed (step S16). When memory copy is completed (step S16: Yes), a memory copy status flag in the shared memory is reset. After that, the CPU register information is returned (step S17), and the execution mode is returned to the original normal mode (step S18).

As shown in step S14 of the memory copy process described above, in the other CPU that is not executing the memory copy process, a simplified TCP/IP switching process shown in FIG. 4A is called by an interrupt. Moreover, in the CPU that is executing the memory copy process, a waiting process shown in FIG. 4B is called.

In a simplified TCP/IP switching process shown in FIG. 4A, after the execution mode is caused to shift to the privilege mode and the register information is saved (steps S21, S22 and S23), a simplified TCP/IP process is executed (step S24). Then, in the simplified TCP/IP switching process, when the simplified TCP/IP process ends, the CPU register information is returned (step S25) and the execution mode is returned to the normal mode (step S26).

Further, in a waiting process shown in FIG. 4B, after the execution mode is caused to shift to the privilege mode and the register information is saved (steps S31, S32 and S33) in the same manner as described above, the memory copy flag on the shared memory is regularly referred to (step S34). When the completion flag is set (step S34: Yes), the CPU register information is returned (step S35) and the execution mode is returned to the normal mode (step S36).

In the simplified TCP/IP process called in step S24 of FIG. 4A, first, processes equivalent to TCP and IP processes are executed on packets on an IP packet queue. When there is no data on the packet queue, a packet input process of loading a reception packet from the network adapter is executed.

To be specific, as shown in FIG. 5A, in a simplified TCP/IP process, when memory copy is being performed (step S41: No), a current pointer of the IP packet queue by the TCP/IP process by the OS is taken over (step S42: Yes), and an unprocessed packet is derived from the IP packet queue (step S44). When the destination IP address of the packet is the dual computer (step S45: Yes) and the protocol type is TCP (step S46: Yes), a simplified TCP process is executed (step S50).

When the protocol type is not TCP (step S46: No), the packet is added to the IP packet queue again so that it is processed by the OS after memory copy is completed (step S47). In this instance, when there is a processed IP packet (step S48: Yes), the head number of the IP packet is recorded so that it is not processed again (step S49).

In a case where the destination IP address of the packet derived from the IP packet queue in step S44 is not the dual computer (step S45: No), the packet is not processed and the next packet is processed. In this instance, the memory copy flag on the shared memory is referred to and, when the completion flag is ON (step S41: Yes), the processing is ended. Moreover, when the IP packet queue becomes vacant, the simplified TCP/IP process shifts to and the IP packet input process.

Figure 5B:
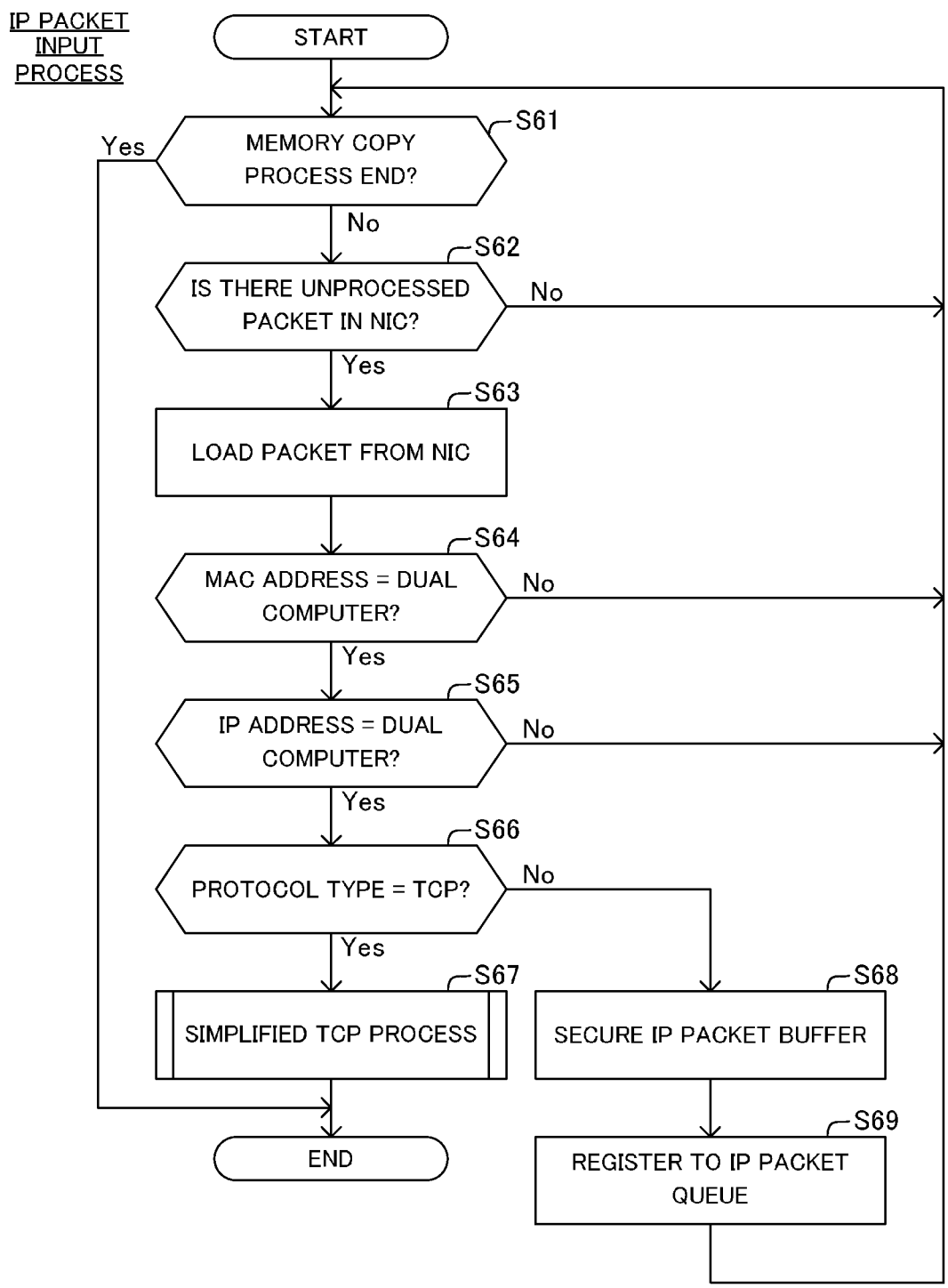
FIG. 5B is a flowchart showing an operation of the dual system disclosed in FIG. 2.

In the IP packet input process shown in FIG. 5B, when memory copy is being performed (step S61: No), new reception data is loaded from the network adapter (step S62: Yes, step S63). Then, it is first checked whether the destination MAC address of the packet is the MAC address of the network adapter (step S64: Yes), and it is next checked whether the destination IP address is the IP address of the dual computer (step S65: Yes). Furthermore, when the protocol type is TCP (step S66: Yes), the simplified TCP process is executed.

In a case where the protocol type is other than TCP (step S66: No), an IP packet buffer is secured on the shared memory (step S68), and an IP packet with the Ethernet header deleted is stored therein. After that, the packet is registered into the IP packet queue (step S69). In the IP packet input process, a driver process, an IP process and a TCP process are serially executed together, and control is not returned to the OS until processing of one packet is completed. Therefore, a packet loaded from the network adapter and to be processed is not registered into the IP packet queue. In a case where packet reception data received by the TCP/IP network adapter is not the target of processing (step S64: No, S65: No), or when the simplified TCP process is completed, processing of the next packet is executed. In the processing, a memory copy flag on the shared memory is referred to and it is checked whether memory copy is completed, and when a completion flag is set (step S61, Yes), the process is ended.

Figure 6:
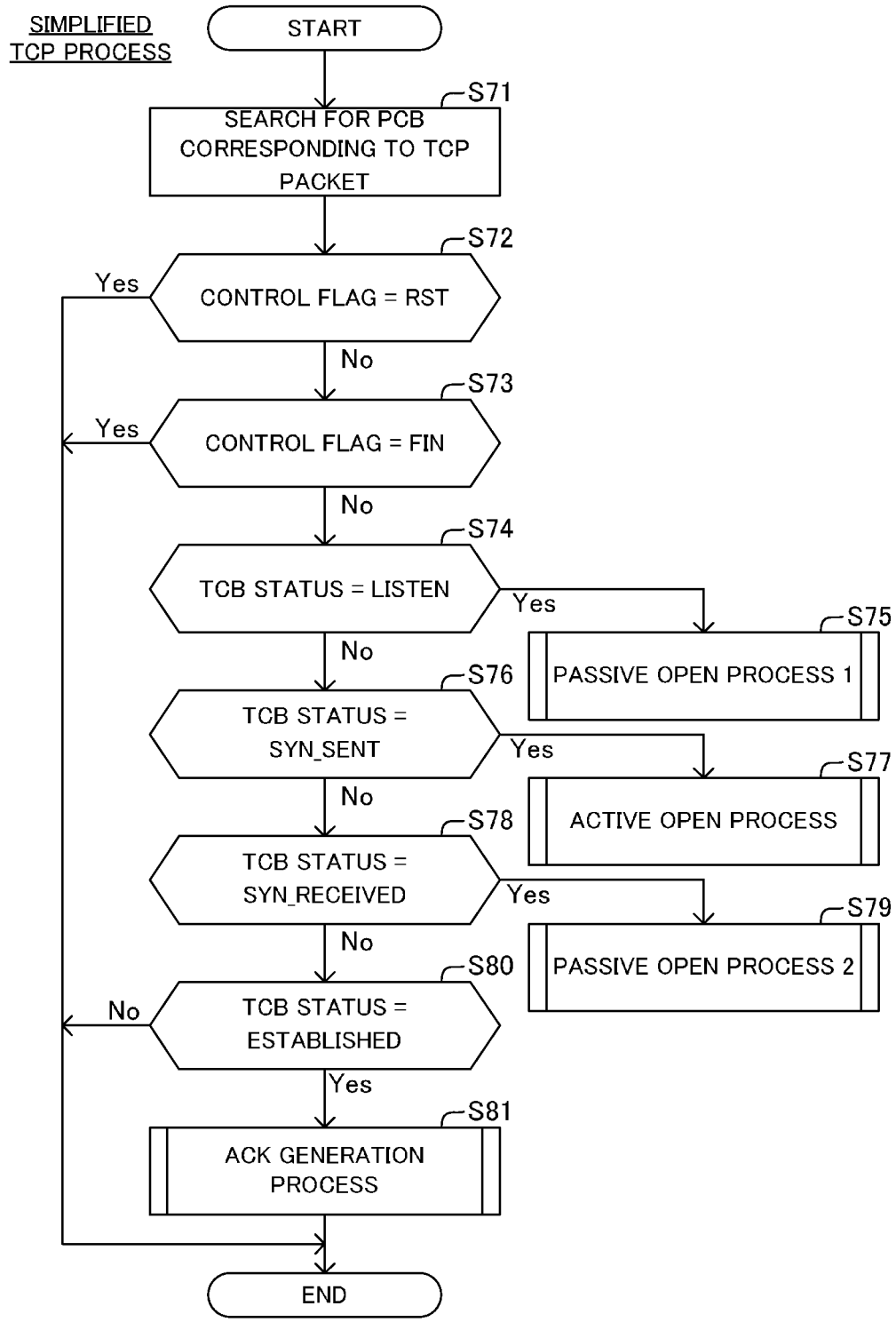
FIG. 6 is a flowchart showing an operation of the dual system disclosed in FIG. 2.

In a simplified TCP process shown in FIG. 6, TCP control blocks are referred to and a connection corresponding to a TCP packet is searched for (step S71). When connection information does not exist, which is a connection CLOSE state, the process is ended. Next, a control flag of header information of the TCP packet is checked, and when RESET or FIN of the control flag is set (step S72: Yes, step S73: Yes), the process is ended.

Next, connection information of the TCP control block is checked, and a process is executed depending on each TCB status (step S72: No, step S73: No). First, a status of waiting for connection is selected. In a case where the TCB status is LISTEN (step S74: Yes), a passive open process 1 is executed (step S75). In a case where the TCB status is SYN_SENT (step S76: Yes), an active open process is executed (step S77). Moreover, in a case where the TCB status is SYN_RECEIVED (step S78: Yes), a passive open process 2 is executed (step S79).

Next, in a case where the TCB status is ESTABLISHED (step S80: Yes), an ACK generation process is executed (step S81). A reception segment not to be processed is added to the IP queue so that it can be processed in the original TCP process when memory copy ends. Moreover, reception data with a PSH flag or an URG flag set is not processed.

In a passive open process 1 shown in FIG. 7A, when SYN of the control flag is set (step S91: Yes), connection establishment preparation is performed by setting the remote IP address, port number and sequence number and the local initial sequence number, and so on, to a TCP control block (steps S92, S93). Moreover, for an ACK response to the destination, a transmission TCP header region is secured on the shared memory and initialization is performed (step S94). After that, the TCB status is changed to SYN_RECEIVED (step S95), and the ACK packet process is executed (step S96).

In a passive open process 2 shown in FIG. 7B, a process in a case where the TCB status is SYN_RECEIVED is executed. First, when ACK of the control flag is set (step S101: Yes), it is checked whether the acknowledgement number of the TCP packet is correct. When there is no problem (step S102, Yes), the TCB status is changed to ESTABLISHED (step S103).

In an active open process shown in FIG. 7C, when SYN and ACK of the control flag are set (step S111: Yes, step S112: Yes), it is checked whether the acknowledgement number of the TCP packet is correct. When there is no problem (step S113: Yes), a socket is established (steps S114, S115), the TCB status is changed to ESTABLISHED (step S116), and the ACK packet generation process is executed (step S120). In the case of a segment with only ACK set, the TCB status shifts to ESTABLISHED.

In an ACK packet generation process shown in FIG. 8A, ACK of the control flag of the TCP header is set (step S131), and then, the window size is set to 0 (steps S132, S133, S134). In a case where the TCB status is SYN_RECEIVED (step S135: Yes), a value of the received sequence number+1 is set to the acknowledgement number (step S137). Otherwise, the received sequence number is set (step S136). After that, an OUTPUT process is executed (step S138).

Figure 8B:
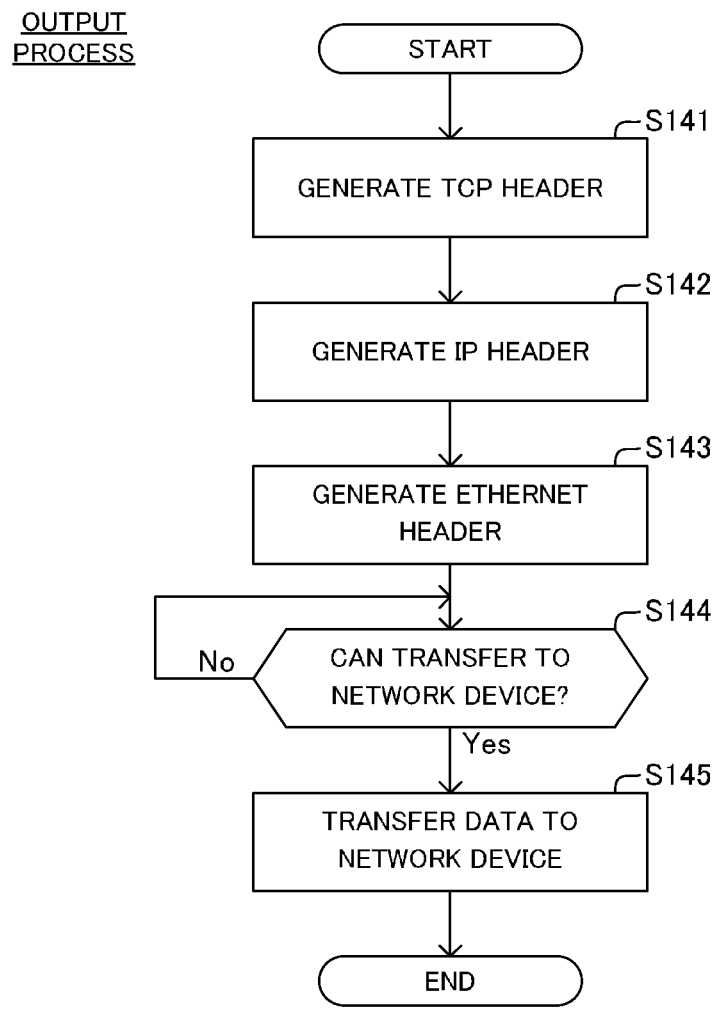
FIG. 8B is a flowchart showing an operation of the dual system disclosed in FIG. 2.

In an OUTPUT process shown in FIG. 8B, an Ethernet packet is generated (steps S141, S142, S143), and when the network adapter is idle (step S144: Yes), the Ethernet packet is transferred to a buffer of the network adapter (step S145: Yes).

As described above, the dual computer 1 in this exemplary embodiment can avoid TCP/IP timeout of a client computer occurring during the CPU installation operation. The simplified TCP/IP processing part 14 that executes the simplified TCP/IP process described above can be mounted in a component such as a management controller and a virtual hypervisor other than the OS, and can be applied to dual computers of all types of configuration.

Second Exemplary Embodiment

Figure 9:
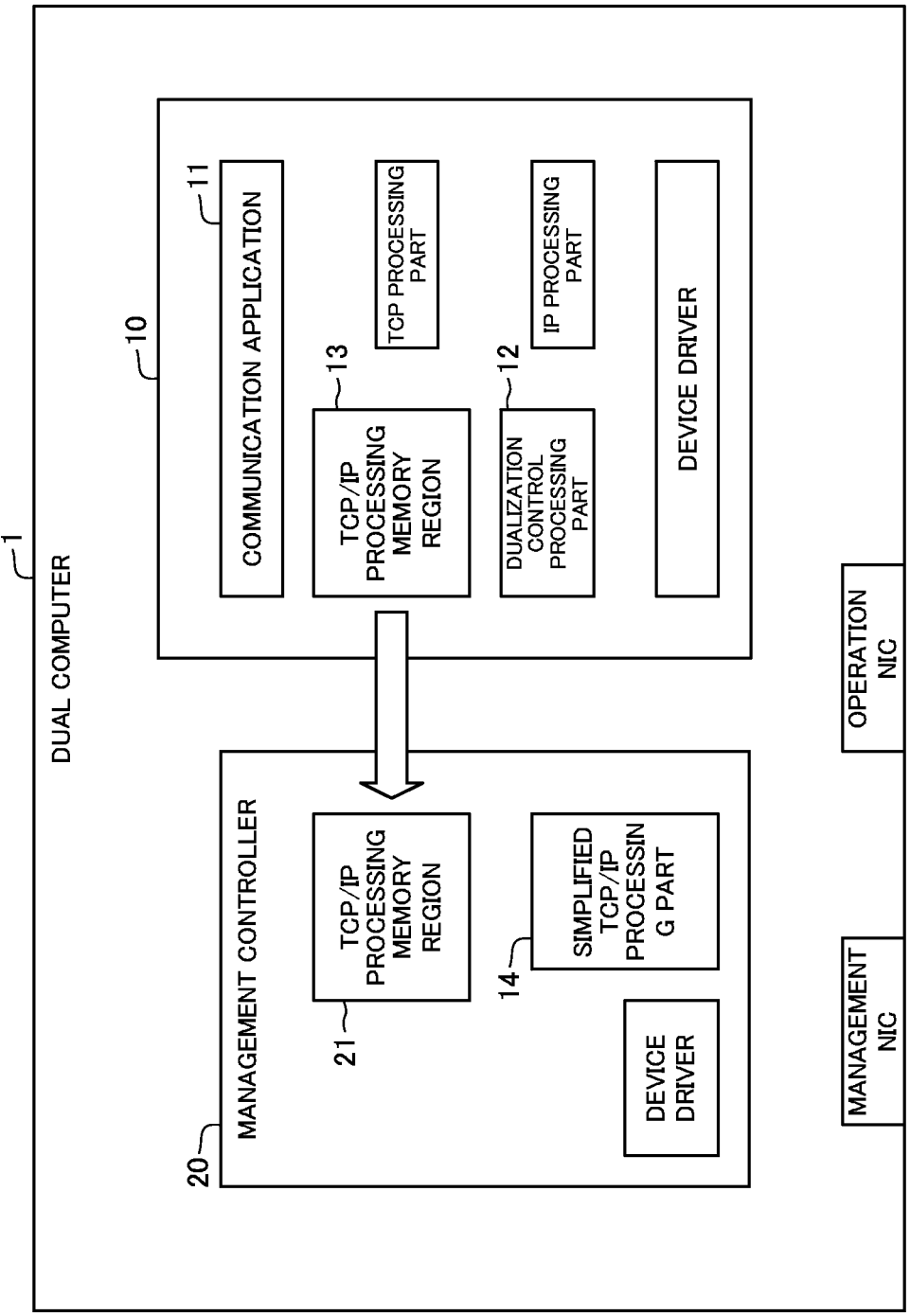
FIG. 9 is a function block diagram showing a configuration of a dual system in a second exemplary embodiment of the present invention.

Next, referring to FIGS. 9 and 10, a second exemplary embodiment of the present invention will be described. FIG. 9 is a diagram showing a configuration of a dual computer, and FIG. 10 is a diagram showing an operation thereof.

In the dual computer 1 in this exemplary embodiment, as shown in FIG. 9, it is possible to structure the simplified TCP/IP processing part 14 not in the OS 10 of the dual computer but in a management controller 20 that is an arithmetic device monitoring the hardware and the OS 10. That is, the simplified TCP/IP process needs to be executed by a CPU other than a CPU that is executing the memory copy process, but can be executed by the management controller instead. However, since an OS space of the management controller 20 and an OS space of the dual computer 1 are different, shared memory regions 13 and 21 in which communication and control data is stored need to be capable of referring to each other, and there is a need to previously transfer to a memory space in the management controller 20 (refer to an arrow in FIG. 9). The management controller 20 usually performs communication with a monitoring terminal and so on by using a dedicated management NIC.

In this exemplary embodiment, the other configurations and operations are the same as in the first exemplary embodiment described above. That is, processes called from the dualization process and from the simplified TCP/IP process are the same as in the first exemplary embodiment. Herein, referring to FIG. 10, the outline of a process executed when switching the TCP/IP process to the management controller 20 will be described.

Figure 10A:
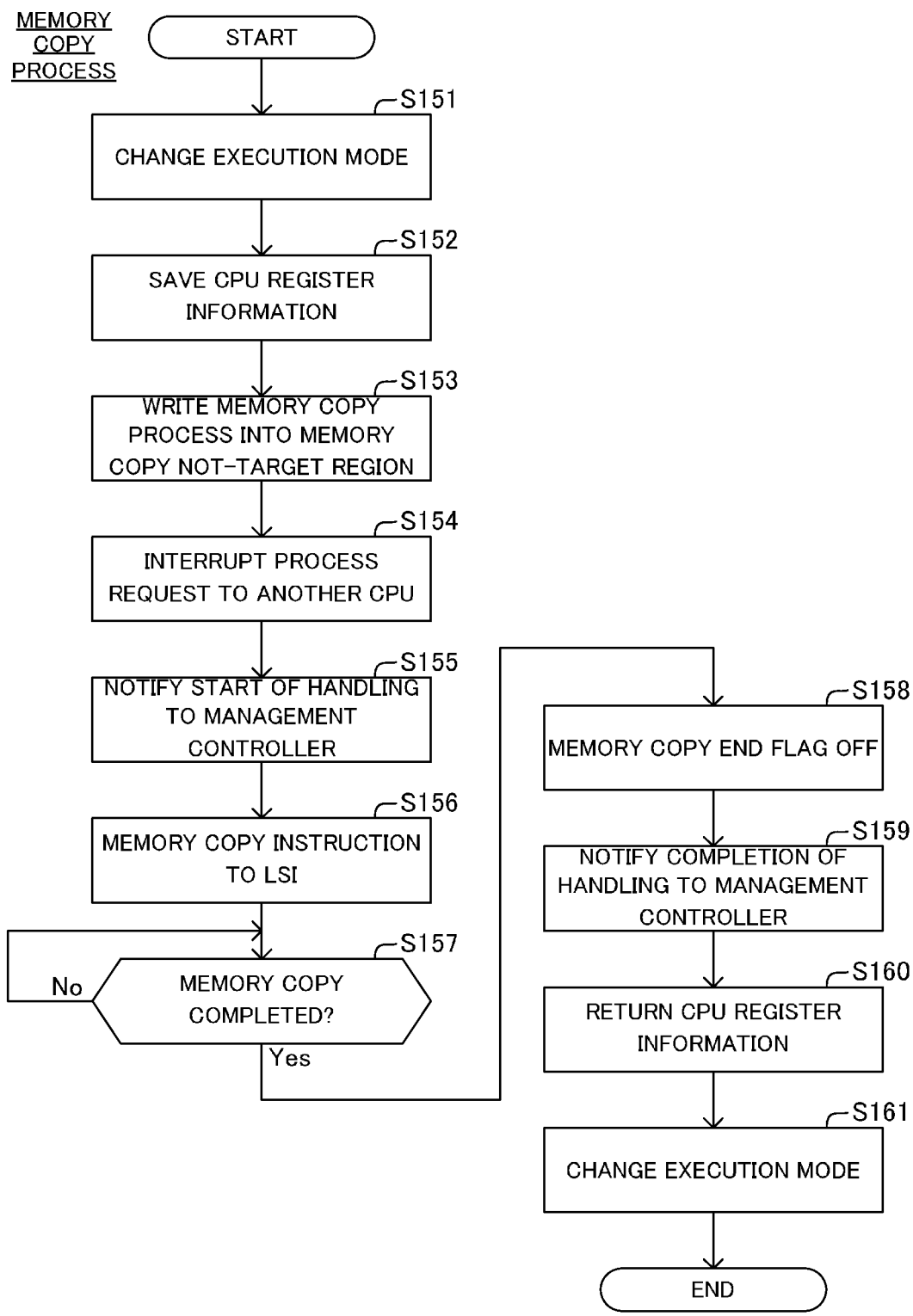
FIG. 10A is a flowchart showing an operation of the dual system disclosed in FIG. 9.

In a memory copy process shown in FIG. 10A called from the dualization process, first, the execution mode is caused to shift to the privilege mode (step S151), and next, register information of the CPU is saved into a memory region other than the memory copy target (step S152). Moreover, the execution code of the memory copy process is copied to the same memory region (step S153), and an interrupt instruction is issued to the other CPU (step S154).

After that, simplified TCP/IP process switching is notified to the management controller 20 (step S155). The CPU that executes memory copy passes a memory copy process instruction to the LSI (step S156), and regularly checks completion of memory copy (step S157).

When memory copy is completed (step S157: Yes), a memory copy status flag in the shared memory is reset (step S158), and simplified TCP/IP process switching is notified to the management controller 20 (step S159). After that, the CPU register information is returned (step S160), and the execution mode is returned to the original normal mode (step S161).

In a simplified TCP/IP switching process shown in FIG. 10B, when notification is received from the dual computer 1, DMA transfer of TCP control data to the memory of the management controller 20 is performed (step S171). After that, in order to allow access from the management controller 20 to an operation NIC, the setting of an operation LAN is validated (step S172), and the simplified TCP/IP process is called (step S173). When the memory copy process is completed and the simplified TCP/IP process is ended, in the simplified TCP/IP switching process, the setting of the operation LAN of the management controller 20 is invalidated (step S174), TCP control data is transferred to the memory (step S175), and the process is ended.

Third Exemplary Embodiment

Figure 11:
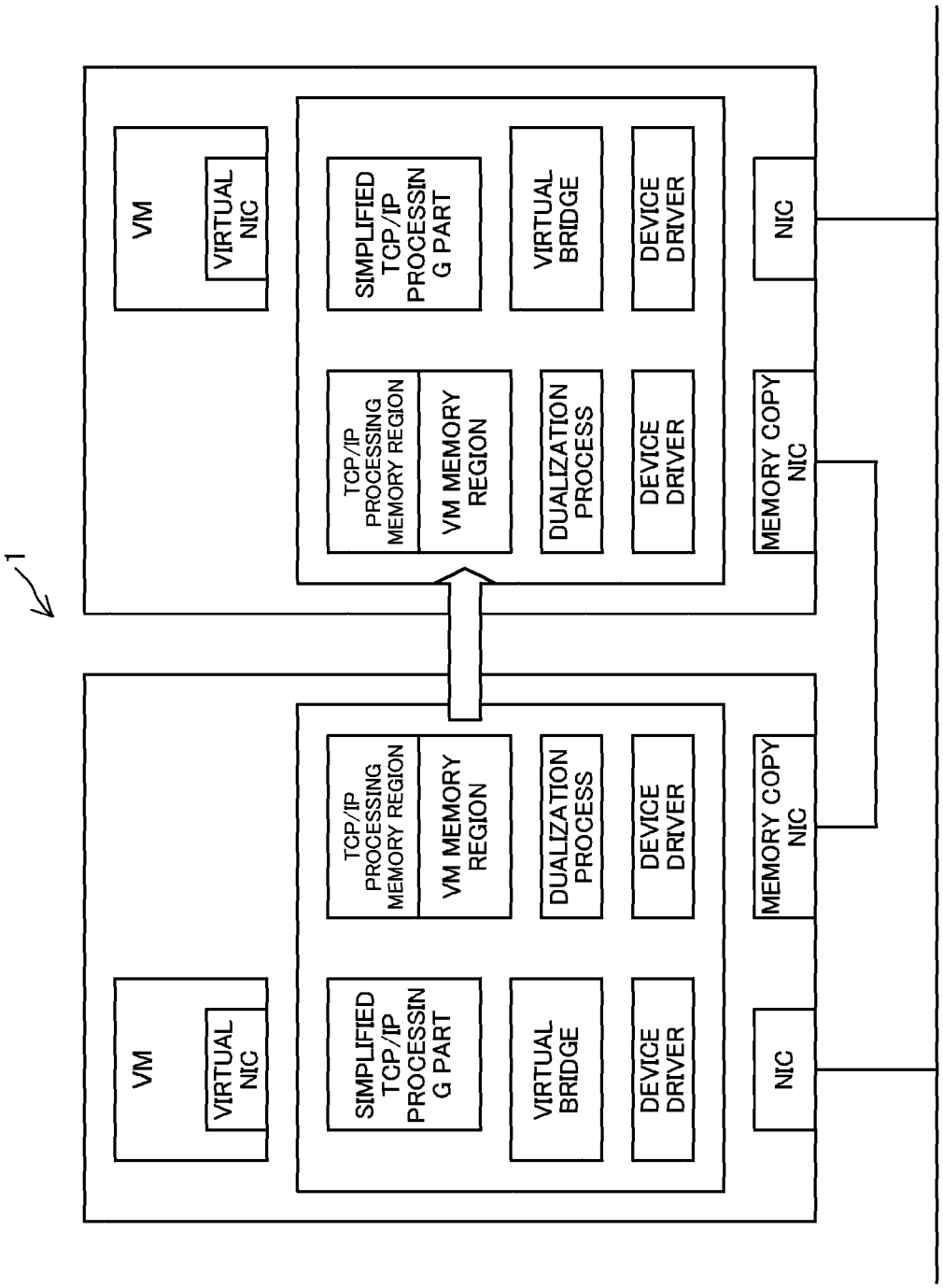
FIG. 11 is a function block diagram showing a configuration of a dual system in a third exemplary embodiment of the present invention.

Next, referring to FIGS. 11 to 13B, a third exemplary embodiment of the present invention will be described. FIG. 11 is a diagram showing a configuration of a dual computer, and FIGS. 12A to 13B are diagrams showing operations thereof.

The dual computer 1 in this exemplary embodiment realizes the dual computer 1 by a software function as shown in FIG. 11. By virtualizing two computers, a virtual machine is dualized. That is, two computers are connected by a high-speed communication cable, and are caused to synchronize by regularly copying CPU context, memory content and the like of one virtual machine to the other computer.

A virtual machine copy function is arranged in the hypervisor layer. A virtual machine has a virtual NIC, which is associated with a physical NIC by a virtual bridge of the hypervisor layer. The virtual bridge distributes communication data received by the physical NIC to the associated virtual machine, and passes communication data sent from the virtual machine to the corresponding physical NIC.

In the software-type dual computer in this exemplary embodiment, in a synchronization process during a normal operation, a memory copy process ends in a short time period because only a difference is copied. However, when starting or when recovering from a state where a single machine operates due to a failure or the like, the entire memory region of the virtual machine is copied. In this exemplary embodiment, as a substitute of the virtual NIC, a simplified TCP/IP processing part is arranged in the hypervisor layer. At the time of memory copy, the virtual bridge notifies communication data received by the physical NIC to the simplified TCP/IP processing part instead of the virtual NIC.

As shown in FIG. 11, the dual computer 1 in this exemplary embodiment has functions of executing a dualization process to make the two computers synchronize, a simplified TCP/IP switching process called from the dualization process, and a simplified TCP/IP process executed instead of a TCP/IP process by the virtual machine during a memory copy process, and includes a shared memory to which the simplified TCP/IP process and the virtual machine can refer and which are outside the memory copy target. Processes called from the dualization process and from the simplified TCP/IP process are the same as in the abovementioned exemplary embodiments. The outline of a process executed when switching the TCP/IP process of the virtual machine to the simplified TCP/IP process is as follows.

In the dualization process shown in FIG. 12A, the virtual machine is temporarily stopped (step S181: Yes, steps S182 and S183), and a simplified TCP/IP switching process is executed (step S184). After that, a memory copy process instruction is passed to a memory copy network card (step S185), and completion check is regularly performed (step S185).

When memory copy is completed (step S186: Yes), the completion flag of the memory copy status in the shared memory is set (step S187), and the virtual machine is restarted (step S188).

Figure 12B:
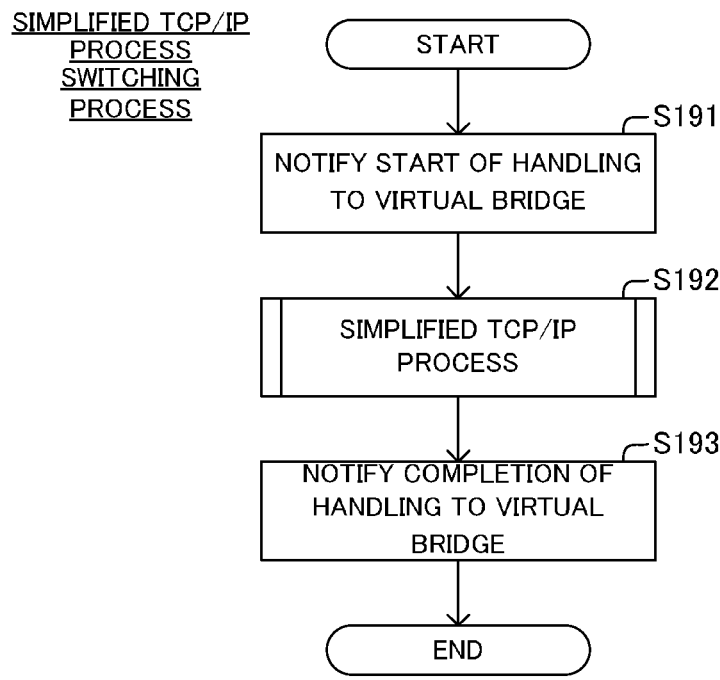
FIG. 12B is a flowchart showing an operation of the dual system disclosed in FIG. 11.

In a simplified TCP/IP switching process shown in FIG. 12B, switching to the simplified TCP/IP process is notified to the virtual bridge (step S191), and thereafter, the simplified TCP/IP process is called (step S192). After the simplified TCP/IP process ends, completion of the switching is notified to the virtual bridge (step S193).

Figure 13A:
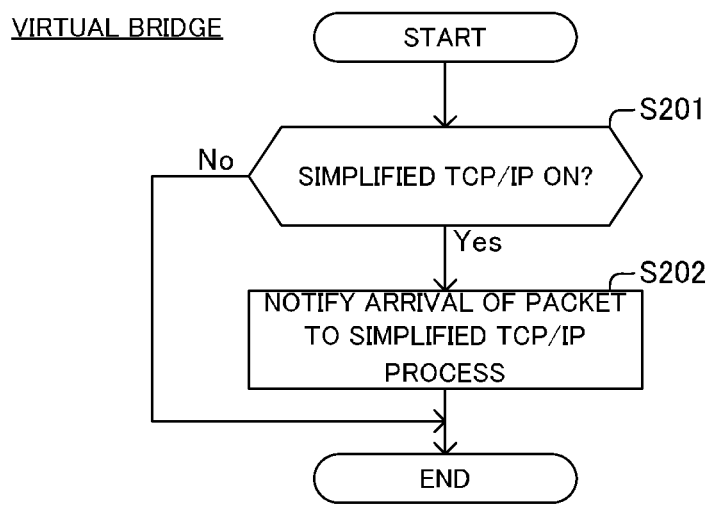
FIG. 13A is a flowchart showing an operation of the dual system disclosed in FIG. 11.

As shown in FIG. 13A, the virtual bridge notifies reception of a communication packet not to the virtual machine but to the simplified TCP/IP processing part during memory copy (step S201: Yes, step S202).

Further, the simplified TCP/IP process operates as shown in FIG. 13B. In this exemplary embodiment, a process lower than the virtual bridge can operate, the simplified TCP/IP process loads a reception packet not from the NIC but from the virtual bridge (step S123). Moreover, an ACK packet transmission request is made to the virtual bridge. In a case where a plurality of virtual machines are operating, the simplified TCP/IP process is caused to operate for each of the virtual machines.

<Supplementary Notes>

The whole or part of the exemplary embodiments disclosed above can be described as the following supplementary notes. Below, the outline of configurations of a dual system, a program and a dualizing method will be described. However, the present invention is not limited to the following configurations.

(Supplementary Note 1)

A dual system configured to provide a predetermined information processing service and equipped with dual computer modules composed of a first computer module and a second computer module, the dual system comprising:

a memory copying unit configured to, when an arithmetic device of the first computer module is installed into the dual system, execute a memory copy process of copying data in a memory region of the second computer module into a memory region of the first computer module;

a substitute processing unit configured to execute a service substitute process that is executed by a different arithmetic device from an arithmetic device executing the memory copy process and that is at least part of processes involved in the information processing service by the dual system; and a shared memory that can be accessed by the second computer module and the substitute processing unit and that stores data of the information processing service by the second computer module and data of the service substitute process by the substitute processing unit, wherein the memory copying unit is configured to execute the memory copy process while excluding the shared memory from a target of the memory copy process.

(Supplementary Note 2)

The dual system according to Supplementary Note 1, comprising a delayed copying unit configured to, after the memory copy process ends, copy the data in the shared memory into the first computer module installed in the dual system.

(Supplementary Note 3)

The dual system according to Supplementary Note 2, wherein:

the shared memory includes a delayed copy region that stores data to be copied by the delayed copying unit, and a not-to-copy region in which a program for executing at least the memory copy process is deployed and from which stored data is not copied by the delayed copying unit; and the substitute processing unit is configured to store data by the service substitute process into the delayed copy region of the shared memory.

(Supplementary Note 4)

The dual system according to any of Supplementary Notes 1 to 3, wherein the substitute processing unit is configured to execute a communication process between the dual system and a user terminal of a user using the information processing service provided by the dual system, as the service substitute process, and store data by the communication process into the shared memory.

(Supplementary Note 5)

The dual system according to Supplementary Note 4, wherein the substitute processing unit is configured to execute only a communication process for maintaining a session established between the dual system and the user terminal, as the service substitute process.

(Supplementary Note 6)

The dual system according to any of Supplementary Notes 1 to 5, wherein the substitute processing unit is configured to, in a case where an arithmetic device of either the first computer module or the second computer module executes the memory copy process, cause an arithmetic device of the other computer module to execute the service substitute process by the substitute processing unit.

(Supplementary Note 7)

A non-transitory computer-readable medium storing a program comprising instructions for causing a dual system, which is configured to provide a predetermined information processing service and equipped with dual computer modules composed of a first computer module and a second computer module, to realize:

a memory copying unit configured to, when an arithmetic device of the first computer module is installed into the dual system, execute a memory copy process of copying data in a memory region of the second computer module into a memory region of the first computer module;

a substitute processing unit configured to execute a service substitute process that is executed by a different arithmetic device from an arithmetic device executing the memory copy process and that is at least part of processes involved in the information processing service by the dual system; and a shared memory that can be accessed by the second computer module and the substitute processing unit and that stores data of the information processing service by the second computer module and data of the service substitute process by the substitute processing unit, and the program comprising instructions for causing the dual system to realize that the memory copying unit is configured to execute the memory copy process while excluding the shared memory from a target of the memory copy process.

(Supplementary Note 8)

The non-transitory computer-readable medium storing the program according to Supplementary Note 7, the program comprising instructions for causing the dual system to realize a delayed copying unit configured to, after the memory copy process ends, copy the data in the shared memory into the first computer module installed in the dual system.

(Supplementary Note 8-2)

The non-transitory computer-readable medium storing the program according to Supplementary Note 8, wherein:

the shared memory includes a delayed copy region that stores data to be copied by the delayed copying unit, and a not-to-copy region in which a program for executing at least the memory copy process is deployed and from which stored data is not copied by the delayed copying unit; and the substitute processing unit is configured to store data by the service substitute process into the delayed copy region of the shared memory.

(Supplementary Note 9)

A dualizing method by a dual system configured to provide a predetermined information processing service and equipped with dual computer modules composed of a first computer module and a second computer module, the dualizing method comprising:

executing a memory copy process of copying data in a memory region of the second computer module into a memory region of the first computer module, when an arithmetic device of the first computer module is installed into the dual system; and executing a service substitute process that is executed by a different arithmetic device from an arithmetic device executing the memory copy process and that is at least part of processes involved in the information processing service by the dual system, wherein the memory copy process is executed while excluding a shared memory from a target of the memory copy process, the shared memory being able to be accessed by the second computer module and an arithmetic device configured to execute the service substitute process, and the shared memory storing data of the information processing service by the second computer module and data of the service substitute process.

(Supplementary Note 10)

The dualizing method according to Supplementary Note 9, comprising executing a delayed copy process of copying the data in the shared memory into the first computer module installed in the dual system, after the memory copy process ends.

(Supplementary Note 10-2)

The dualizing method according to Supplementary Note 10, wherein:

the shared memory includes a delayed copy region that stores data to be copied by the delayed copying unit, and a not-to-copy region in which a program for executing at least the memory copy process is deployed and from which stored data is not copied by the delayed copying unit; and in the service substitute process, data by the service substitute process is stored into the delayed copy region of the shared memory.

(Supplementary Note 10-3)

The dualizing method according to any of Supplementary Notes 9 to 10-2, wherein in the service substitute process, a communication process between the dual system and a user terminal of a user using the information processing service provided by the dual system is executed as the service substitute process, and data by the communication process is stored into the shared memory.

(Supplementary Note 10-4)

The dualizing method according to Supplementary Note 10-3, wherein in the service substitute process, only a communication process for maintaining a session established between the dual system and the user terminal is executed as the service substitute process.

The program described above is stored in a storage device or recorded on a computer-readable recording medium. For example, the recording medium is a portable medium such as a flexible disk, an optical disk, a magneto-optical disk and a semiconductor memory.

Although the present invention has been described above by referring to the exemplary embodiments, the present invention is not limited to the above exemplary embodiments. The configurations and details of the present invention can be modified in various manners that can be understood one skilled in the art within the scope of the present invention.

The invention claimed is:

1. A dual system configured to provide a predetermined information processing service and equipped with dual computer modules composed of a first computer module and a second computer module, the dual system comprising:

a memory copying unit configured to, when an arithmetic device of the first computer module is installed into the dual system, execute a memory copy process of copying data in a memory region of the second computer module into a memory region of the first computer module;

a substitute processing unit configured to execute a service substitute process that is executed by a different arithmetic device from an arithmetic device executing the memory copy process and that is at least part of processes involved in the information processing service by the dual system, during the memory copy process; and a shared memory that can be accessed by the second computer module and the substitute processing unit and that stores data of the information processing service by the second computer module and data of the service substitute process by the substitute processing unit, wherein the memory copying unit is configured to execute the memory copy process while excluding the shared memory from a target of the memory copy process, and the dual system further comprises a delayed copying unit configured to, after confirming that the memory copy process ends, copy the data in the shared memory into the first computer module installed in the dual system.

2. The dual system according to claim 1, wherein:
the shared memory includes a delayed copy region that stores data to be copied by the delayed copying unit, and a not-to-copy region in which a program for executing at least the memory copy process is deployed and from which stored data is not copied by the delayed copying unit; and
the substitute processing unit is configured to store data by the service substitute process into the delayed copy region of the shared memory.

3. The dual system according to claim 1, wherein the substitute processing unit is configured to execute a communication process between the dual system and a user terminal of a user using the information processing service provided by the dual system, as the service substitute process, and store data by the communication process into the shared memory.

4. The dual system according to claim 3, wherein the substitute processing unit is configured to execute only a communication process for maintaining a session established between the dual system and the user terminal, as the service substitute process.

5. The dual system according to claim 1, wherein the substitute processing unit is configured to, in a case where an arithmetic device of either the first computer module or the second computer module executes the memory copy process, cause an arithmetic device of the other computer module to execute the service substitute process by the substitute processing unit.

6. A non-transitory computer-readable medium storing a program comprising instructions for causing a dual system, which is configured to provide a predetermined information processing service and equipped with dual computer modules composed of a first computer module and a second computer module, to realize:
a memory copying unit configured to, when an arithmetic device of the first computer module is installed into the dual system, execute a memory copy process of copying data in a memory region of the second computer module into a memory region of the first computer module;
a substitute processing unit configured to execute a service substitute process that is executed by a different arithmetic device from an arithmetic device executing the memory copy process and that is at least part of processes involved in the information processing service by the dual system, during the memory copy process; and
a shared memory that can be accessed by the second computer module and the substitute processing unit and that stores data of the information processing service by the second computer module and data of the service substitute process by the substitute processing unit, and
the program comprising instructions for causing the dual system to realize that the memory copying unit is configured to execute the memory copy process while excluding the shared memory from a target of the memory copy process the program comprising instructions for causing the dual system to realize a delayed copying unit configured to, after confirming that the memory copy process ends, copy the data in the shared memory into the first computer module installed in the dual system.

7. A dualizing method by a dual system configured to provide a predetermined information processing service and equipped with dual computer modules composed of a first computer module and a second computer module, the dualizing method comprising:
executing a memory copy process of copying data in a memory region of the second computer module into a memory region of the first computer module, when an arithmetic device of the first computer module is installed into the dual system; and
executing a service substitute process that is executed by a different arithmetic device from an arithmetic device executing the memory copy process and that is at least part of processes involved in the information processing service by the dual system, during the memory copy process,
wherein the memory copy process is executed while excluding a shared memory from a target of the memory copy process, the shared memory being able to be accessed by the second computer module and an arithmetic device configured to execute the service substitute process, and the shared memory storing data of the information processing service by the second computer module and data of the service substitute process;
executing a delayed copy process of copying the data in the shared memory into the first computer module installed in the dual system, after confirming that the memory copy process ends.

* * * * *